United States Patent
Matsumoto

(10) Patent No.: US 6,873,385 B2
(45) Date of Patent: Mar. 29, 2005

(54) LIQUID CRYSTAL DISPLAY WITH SELECTIVELY PLACED BARRIERS

(75) Inventor: Kimikazu Matsumoto, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 274 days.

(21) Appl. No.: 09/949,633

(22) Filed: Sep. 12, 2001

(65) Prior Publication Data

US 2002/0036738 A1 Mar. 28, 2002

(30) Foreign Application Priority Data

Sep. 11, 2000 (JP) .......................... 2000-275708

(51) Int. Cl.$^7$ .................. G02F 1/1337; G02F 1/136; H01L 29/03; H01L 31/036; H01L 31/0376
(52) U.S. Cl. ...................... 349/123; 349/42; 257/59
(58) Field of Search .................. 257/59; 349/42, 349/123

(56) References Cited

U.S. PATENT DOCUMENTS 6,549,251 B2 * 4/2003 Kim .......................... 349/43

FOREIGN PATENT DOCUMENTS

| EP | 1 030 211 A2 | 8/2000 | | |
| JP | 06084946 A | * 3/1994 | .................. | 257/59 |

* cited by examiner

Primary Examiner—Long Pham
Assistant Examiner—Howard Weiss
(74) Attorney, Agent, or Firm—Young & Thompson

(57) ABSTRACT

An LCD (Liquid Crystal Display) is provided in which shavings of an alignment layer are accumulated only in regions surrounding a TFT (Thin Film Transistor) in a TFT substrate in a concentrated manner. A barrier made of an insulating material is formed in a manner to cover portions surrounding the TFT including step portions of the TFT on a back channel in the TFT substrate and to be disposed at a place on a downstream side in a rubbing direction.

13 Claims, 18 Drawing Sheets

[Title of the Document] Drawings
[FIG.1]
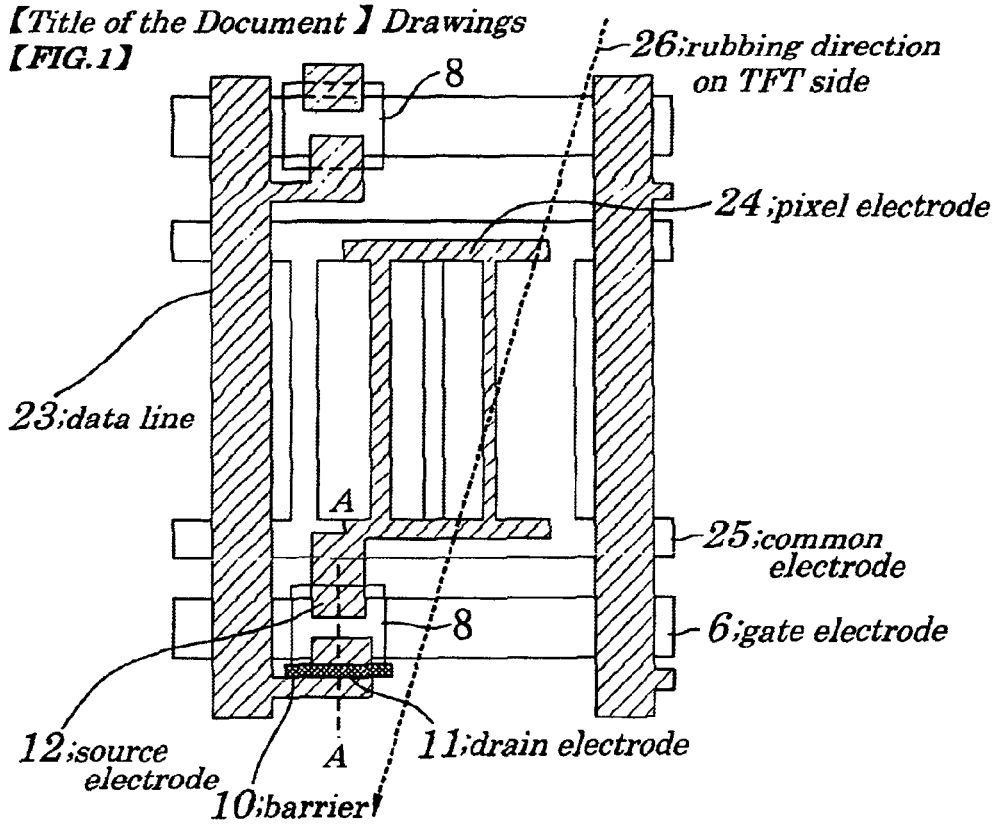
[FIG.2]
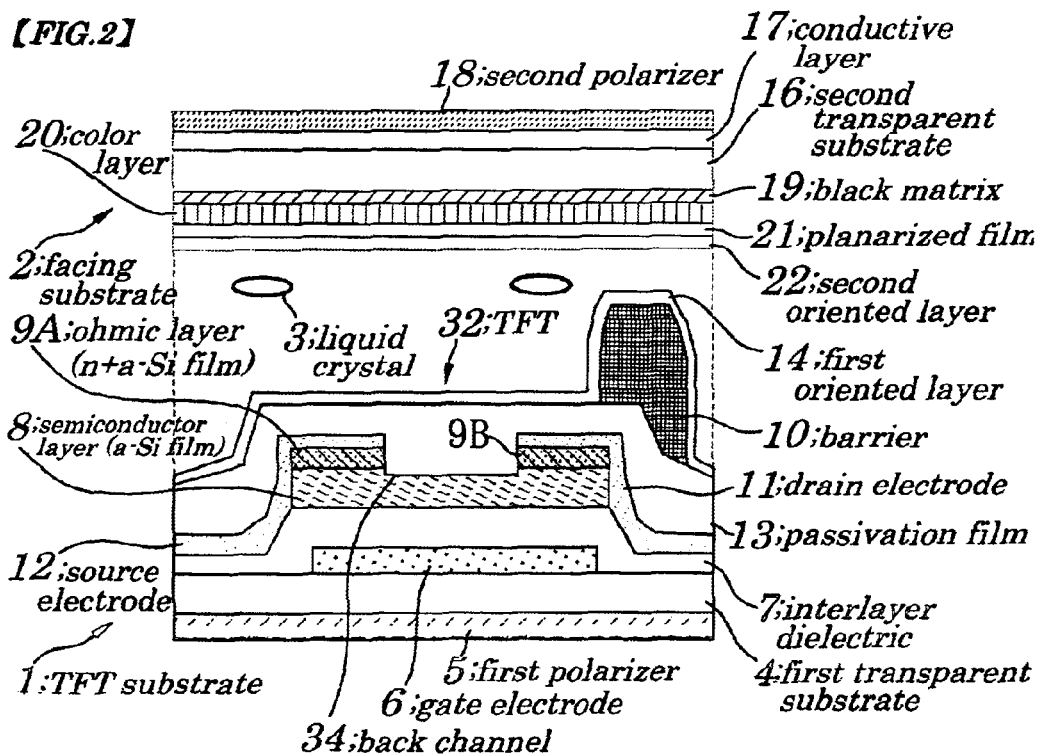

[FIG.3]
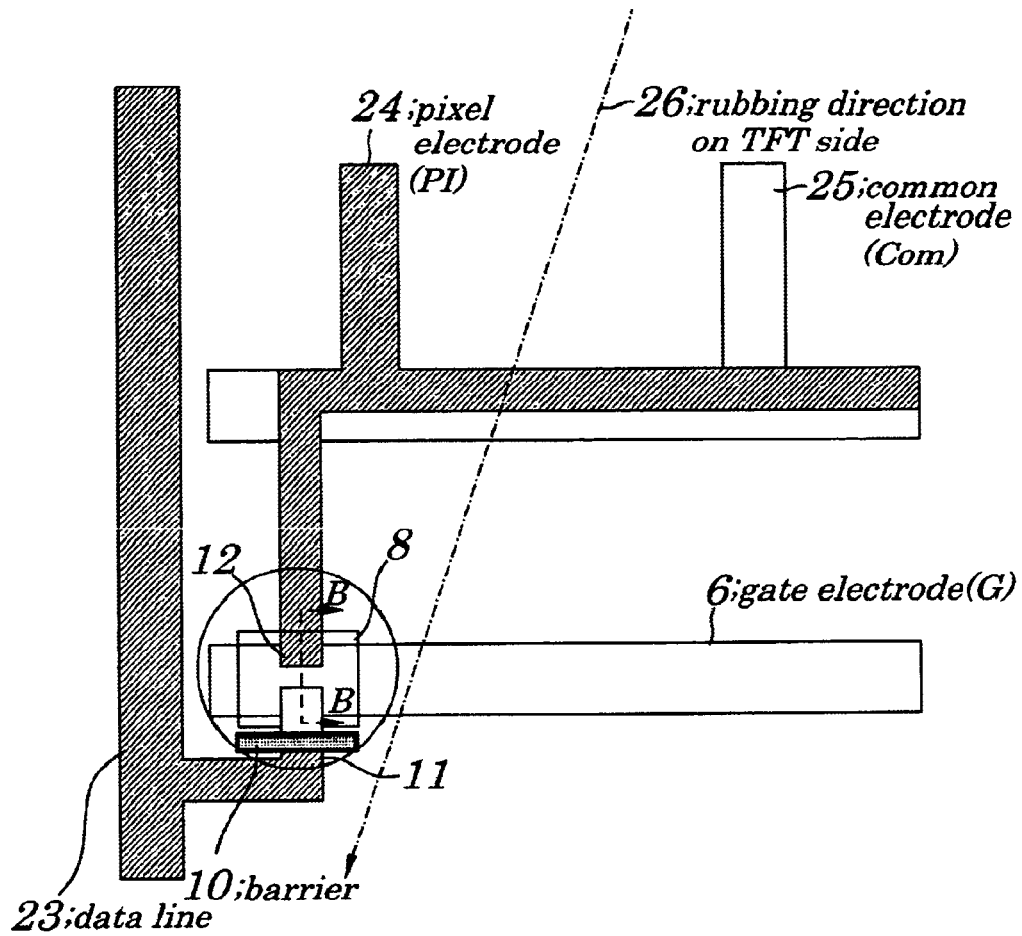
[FIG.4]
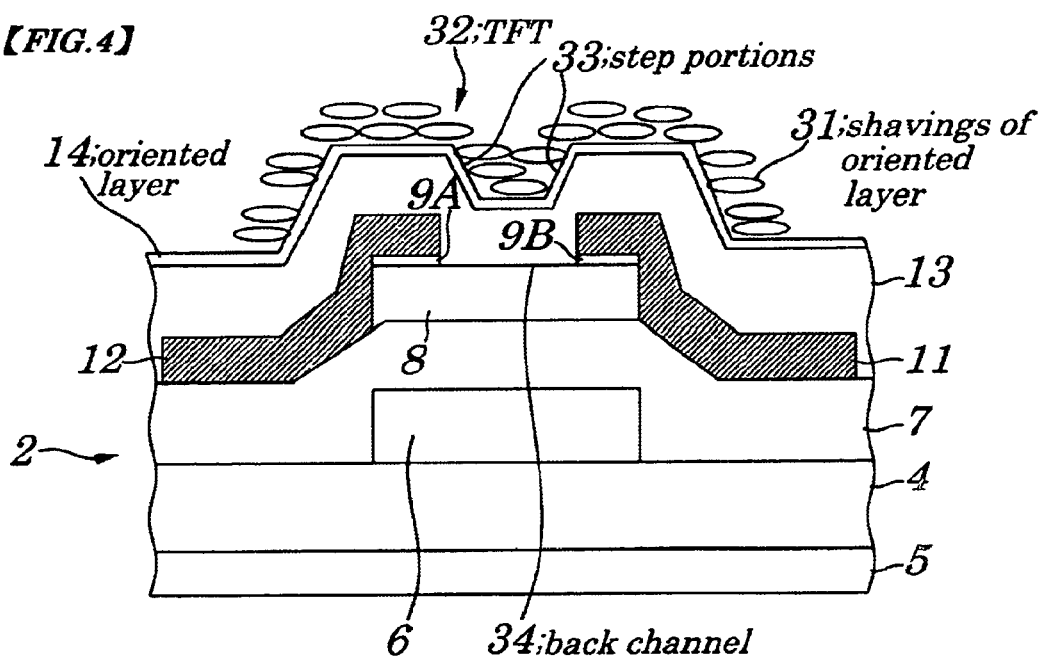

[FIG.5]
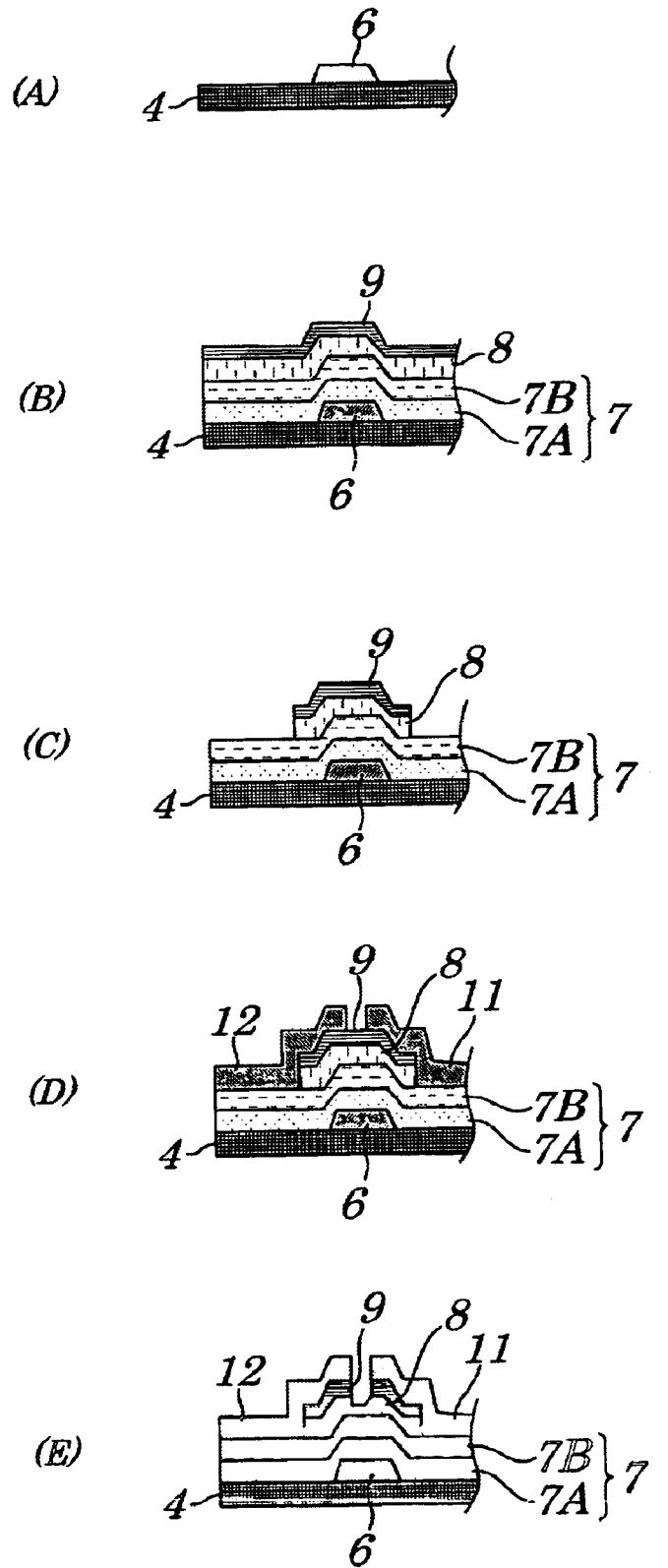

[FIG.6]
(F) 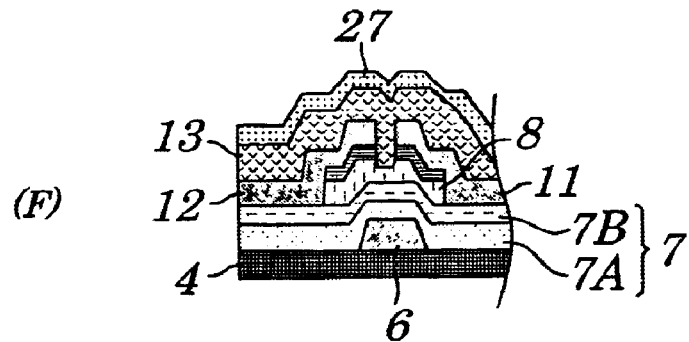
(G) 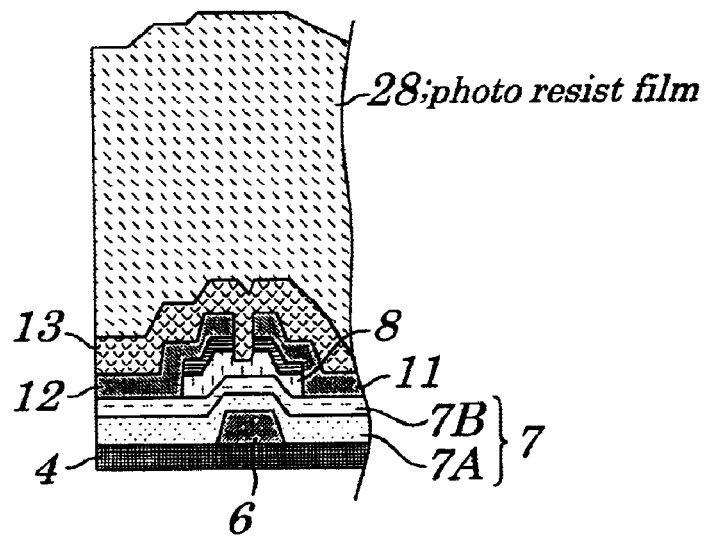
28; photo resist film
(H) 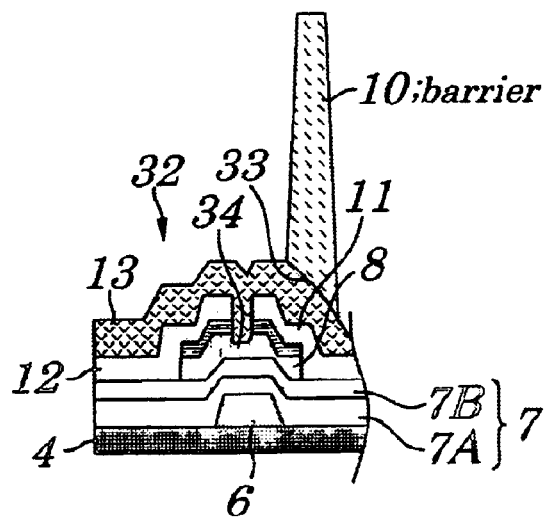
10; barrier

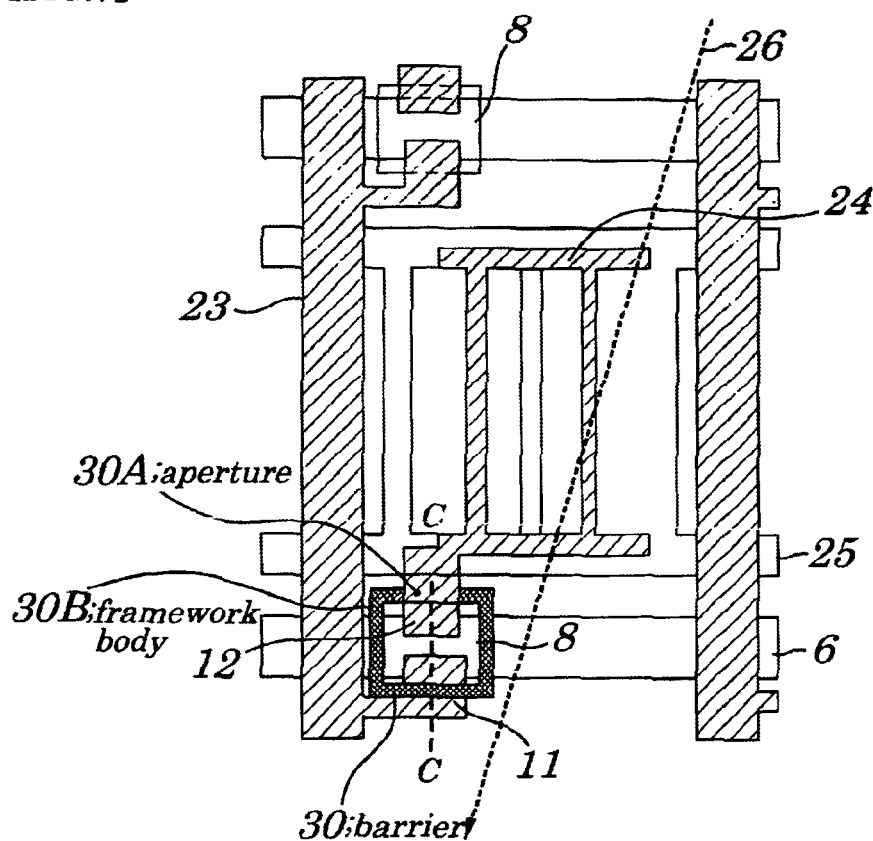
[FIG. 7]
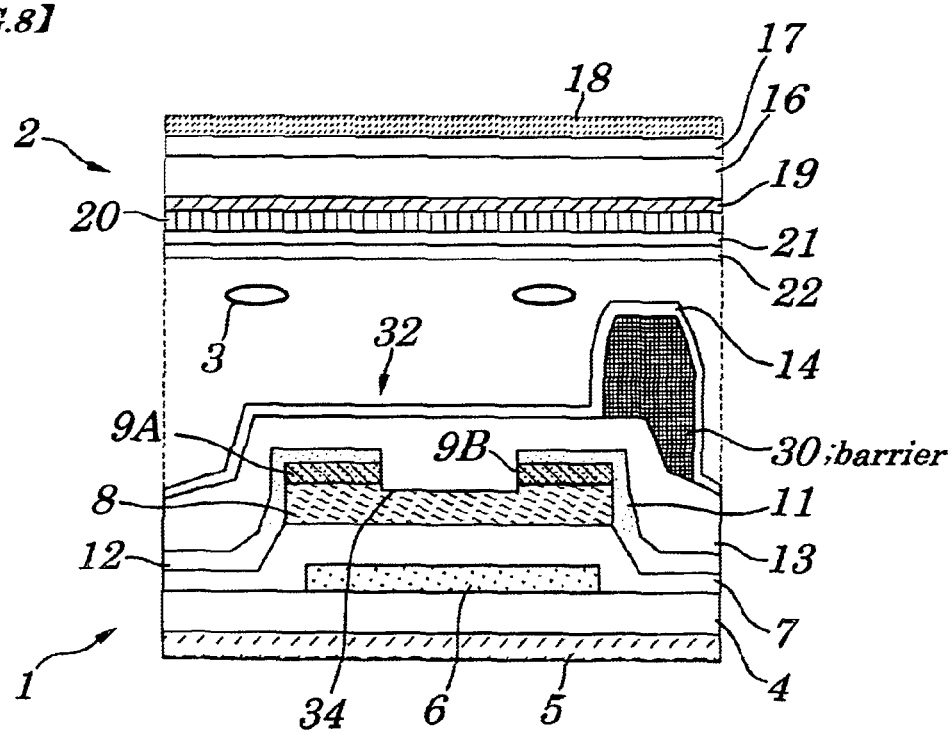
[FIG. 8]

[FIG.9]
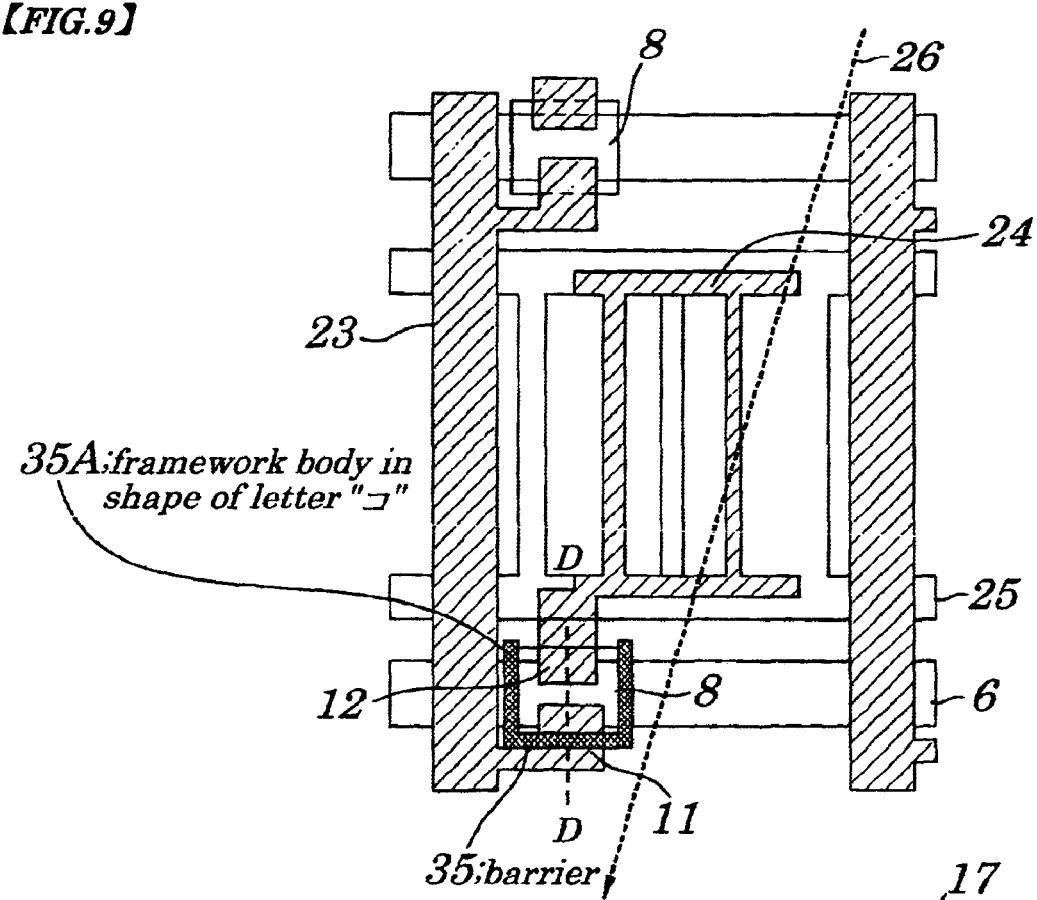
35A: framework body in shape of letter "⊐"
35: barrier
[FIG.10]
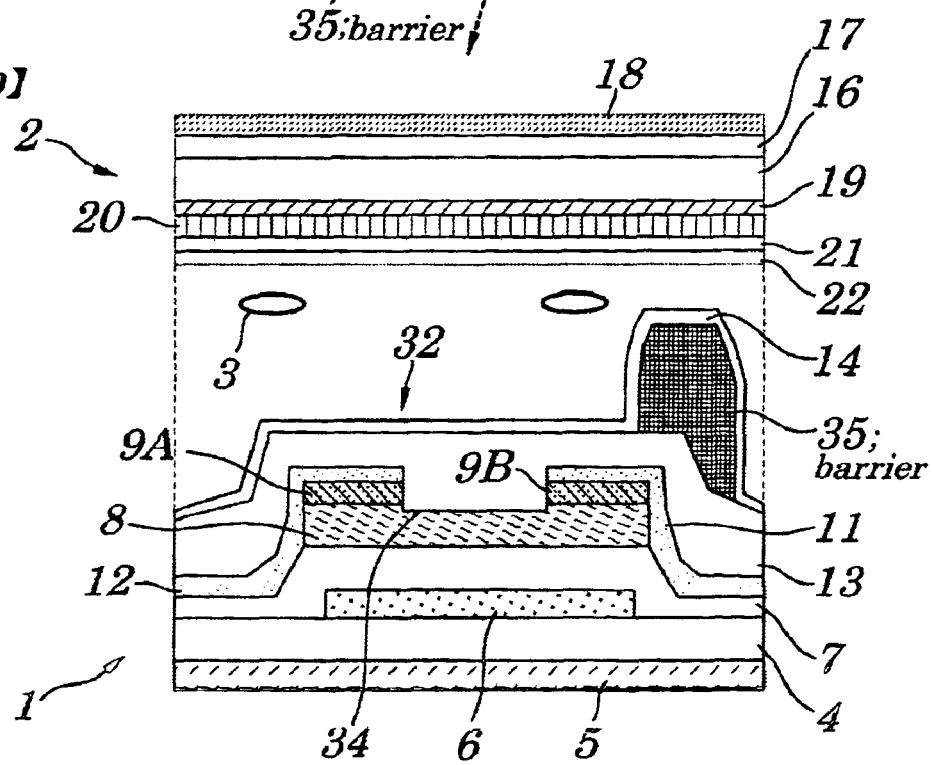
35; barrier

[FIG.11]
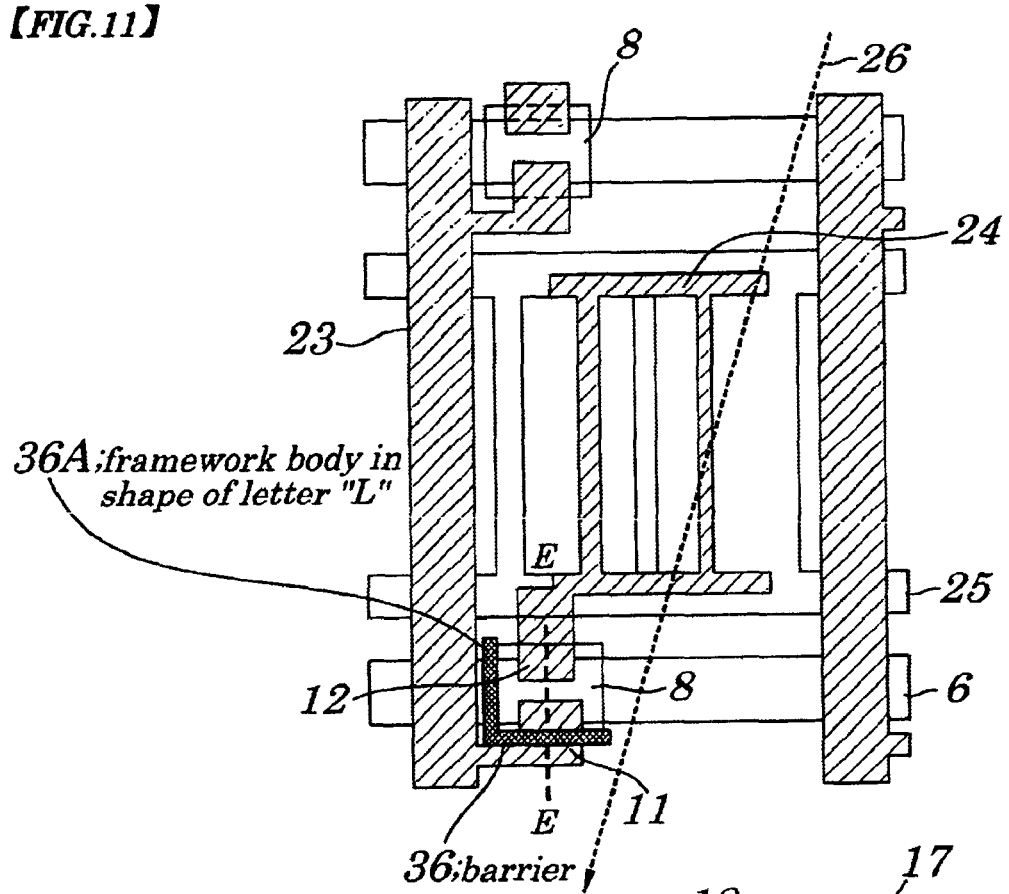
[FIG.12]
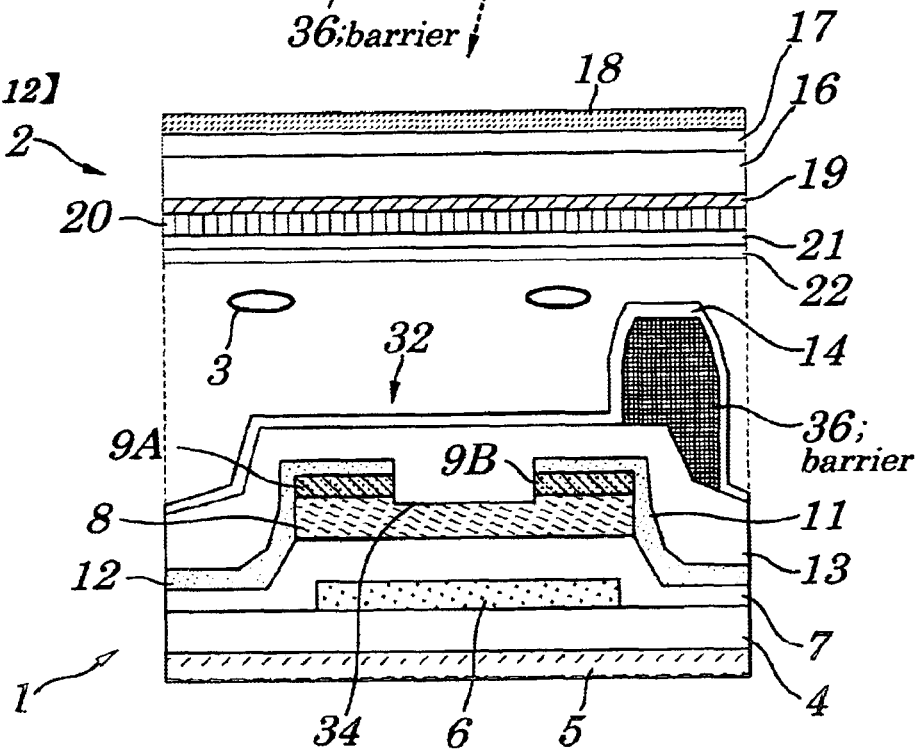

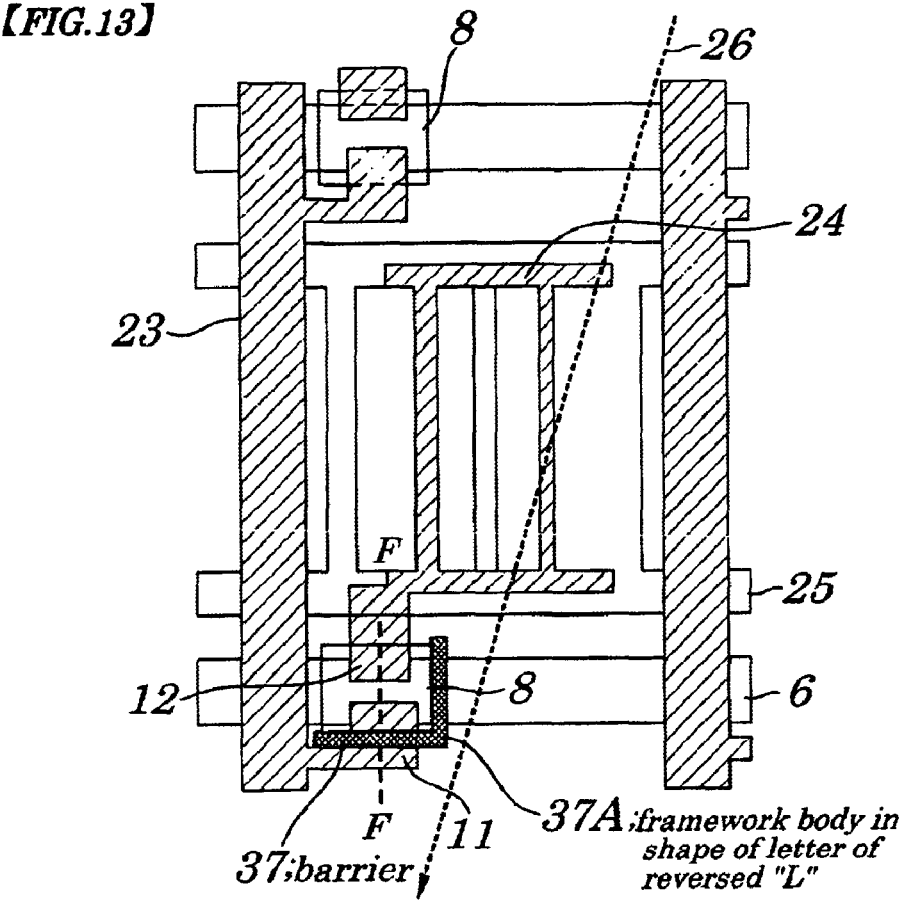
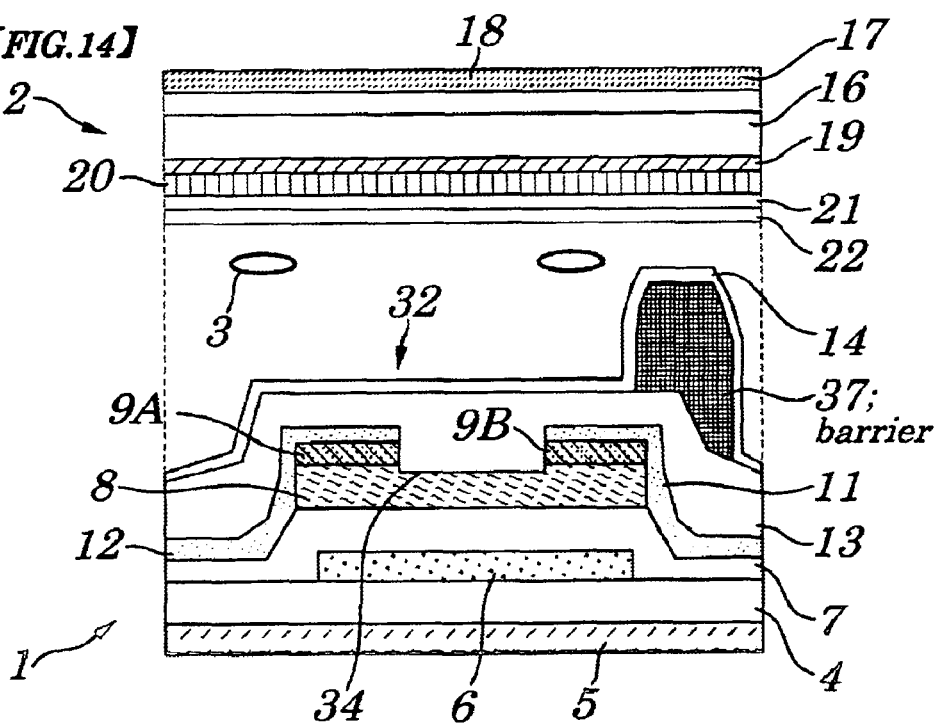

[FIG.15]
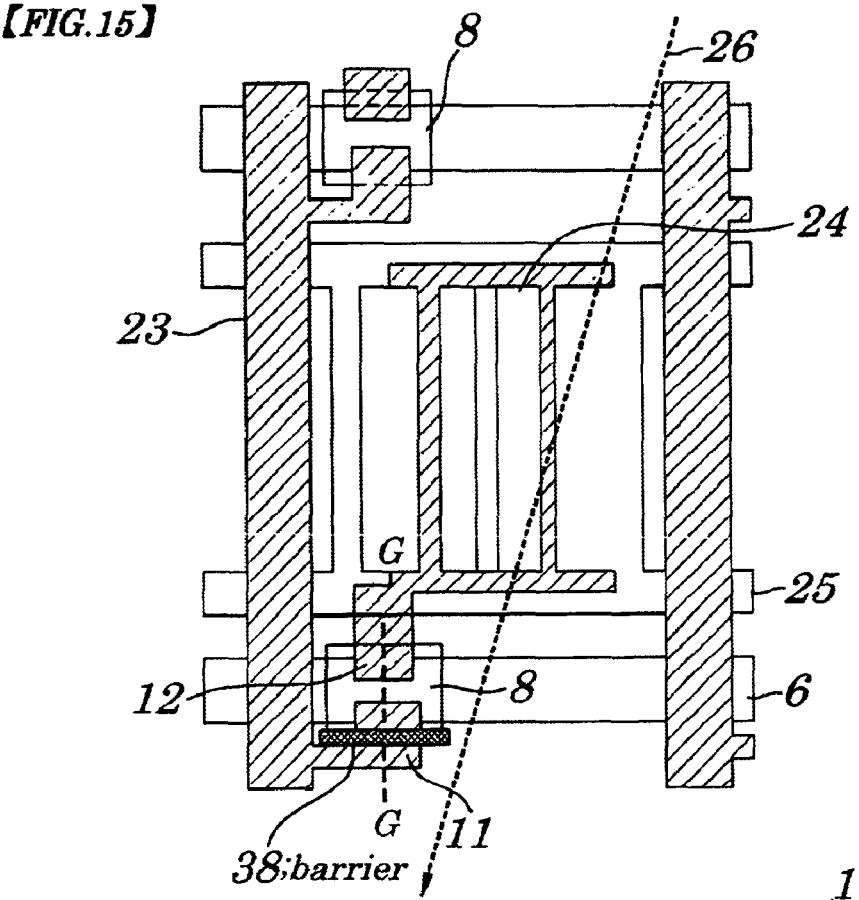
[FIG.16]
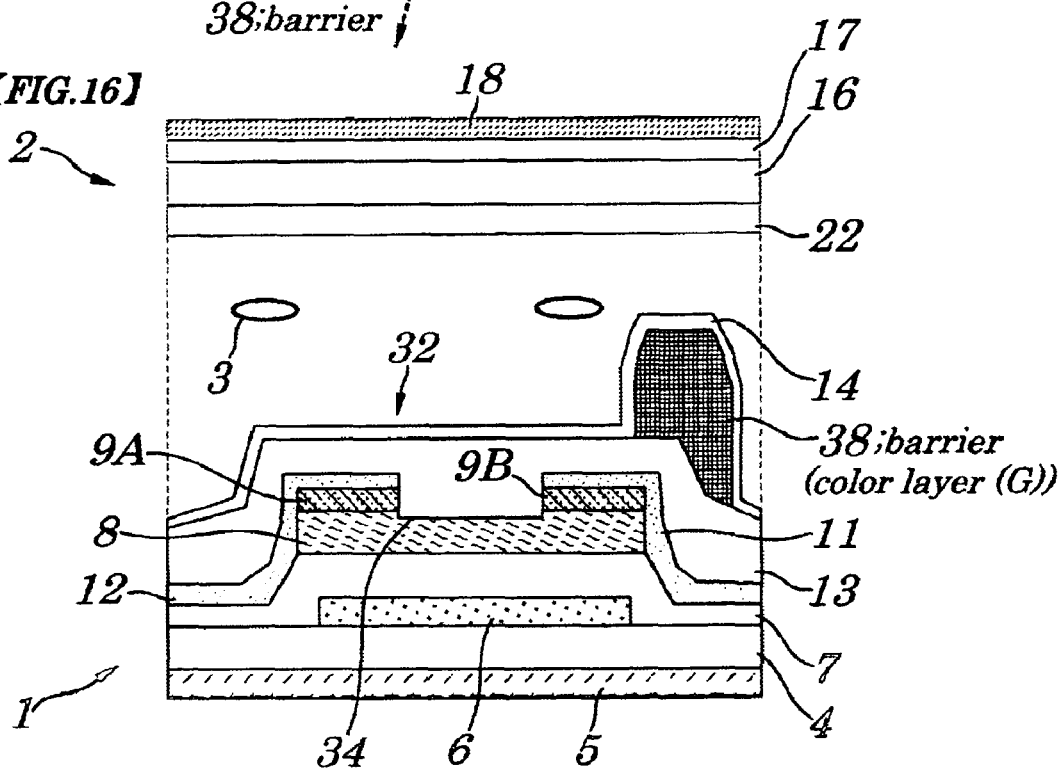

[FIG.17]
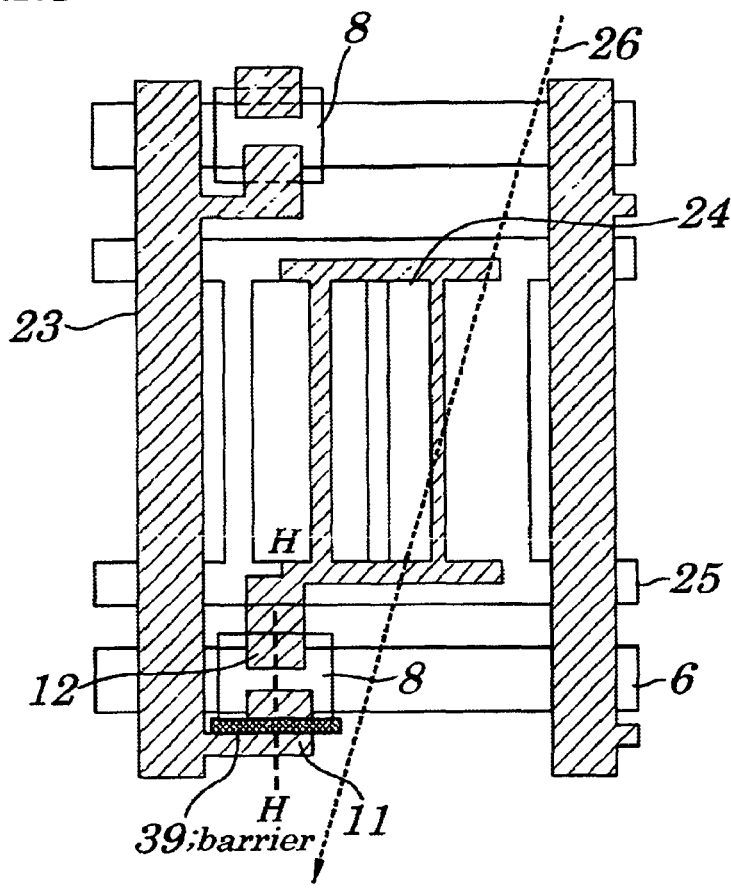
[FIG.18]
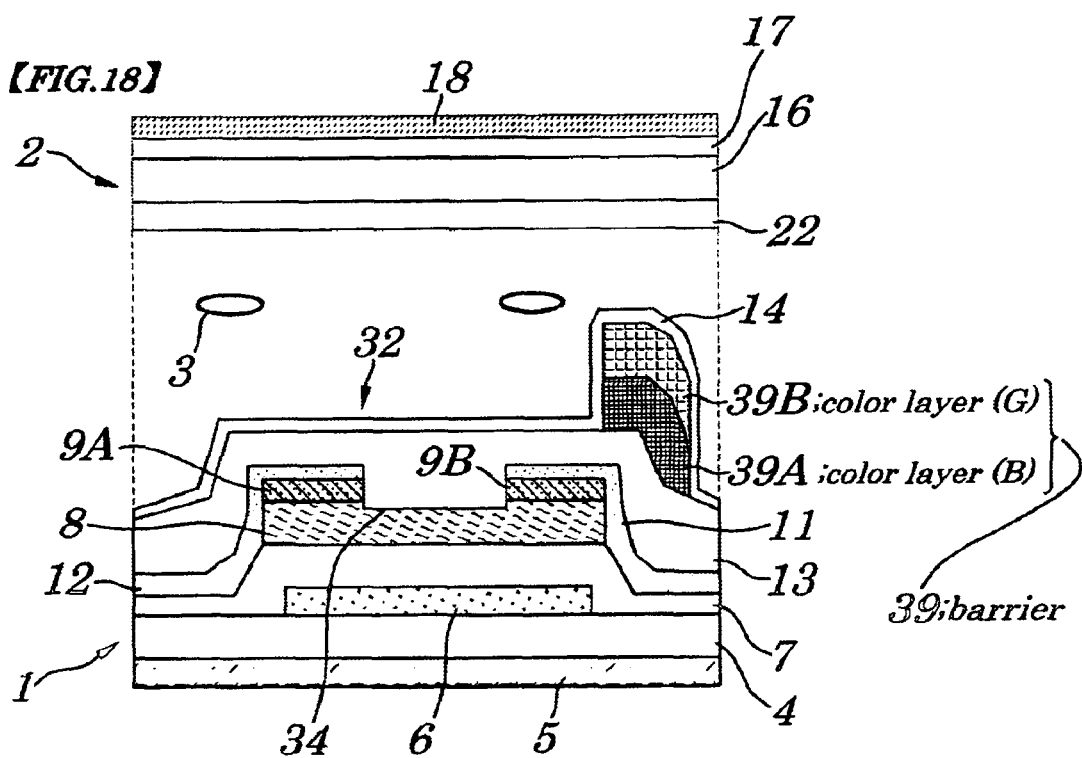

[FIG.19]
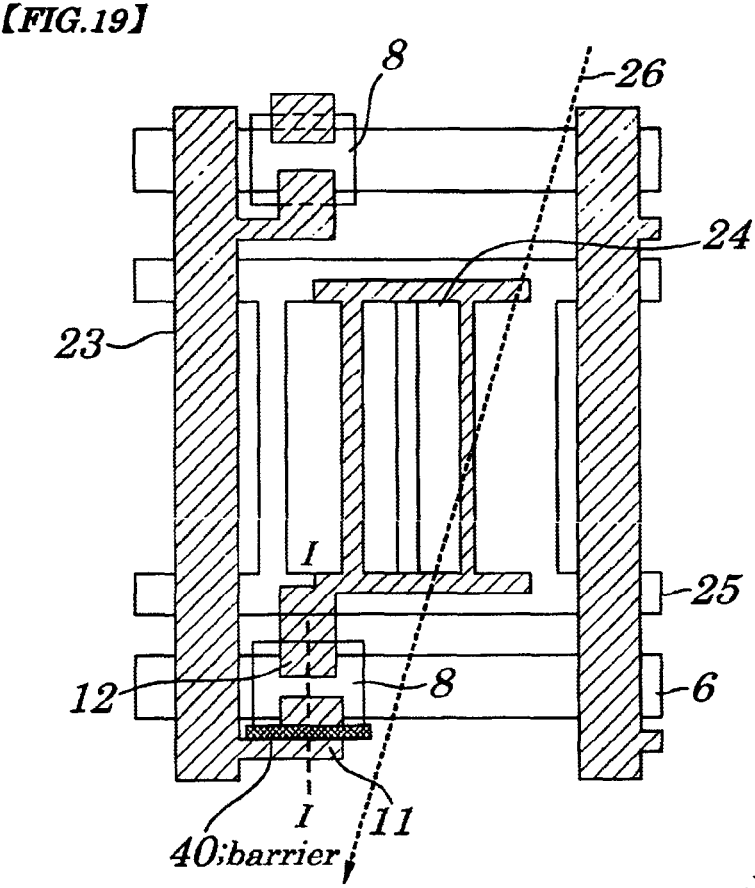
40; barrier
[FIG.20]
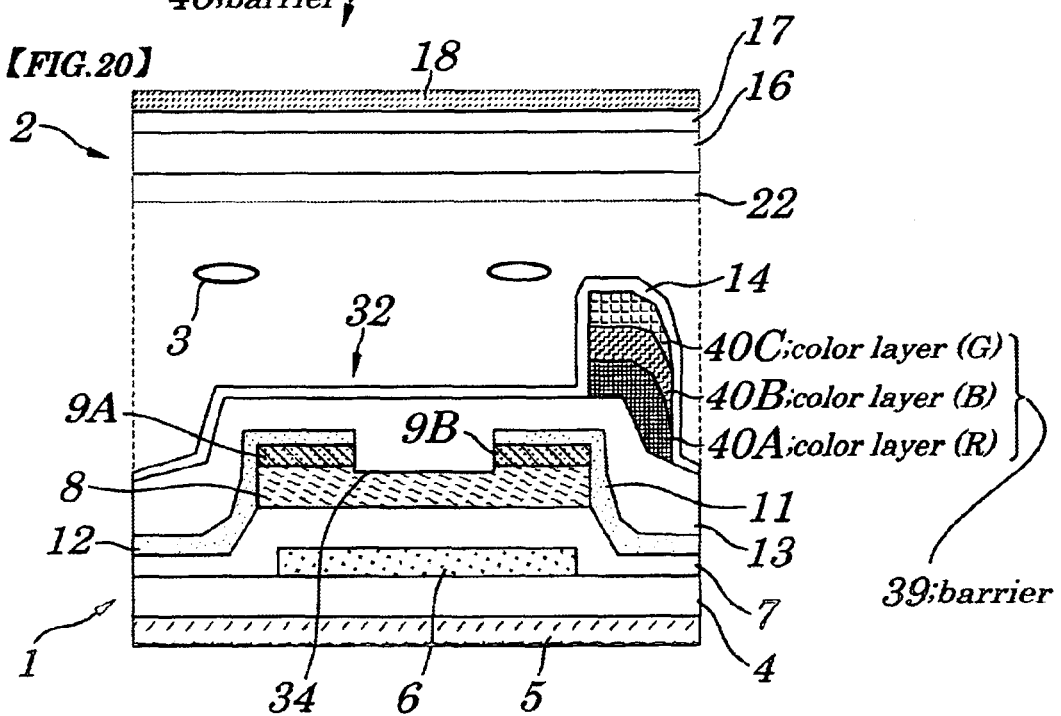
40C; color layer (G)
40B; color layer (B)
40A; color layer (R)
39; barrier

[FIG.21]
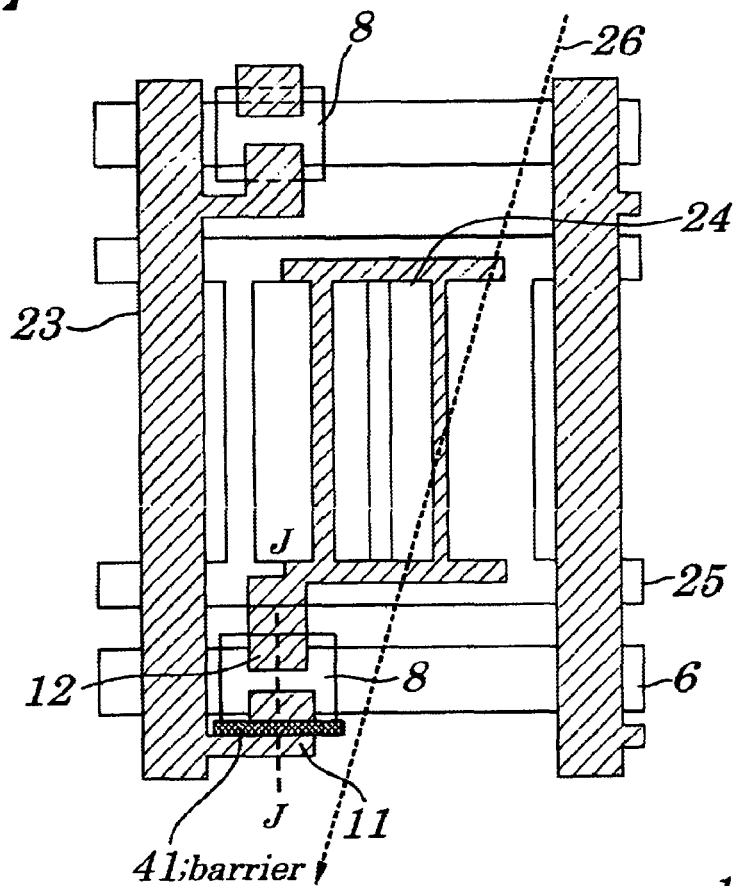
[FIG.22]
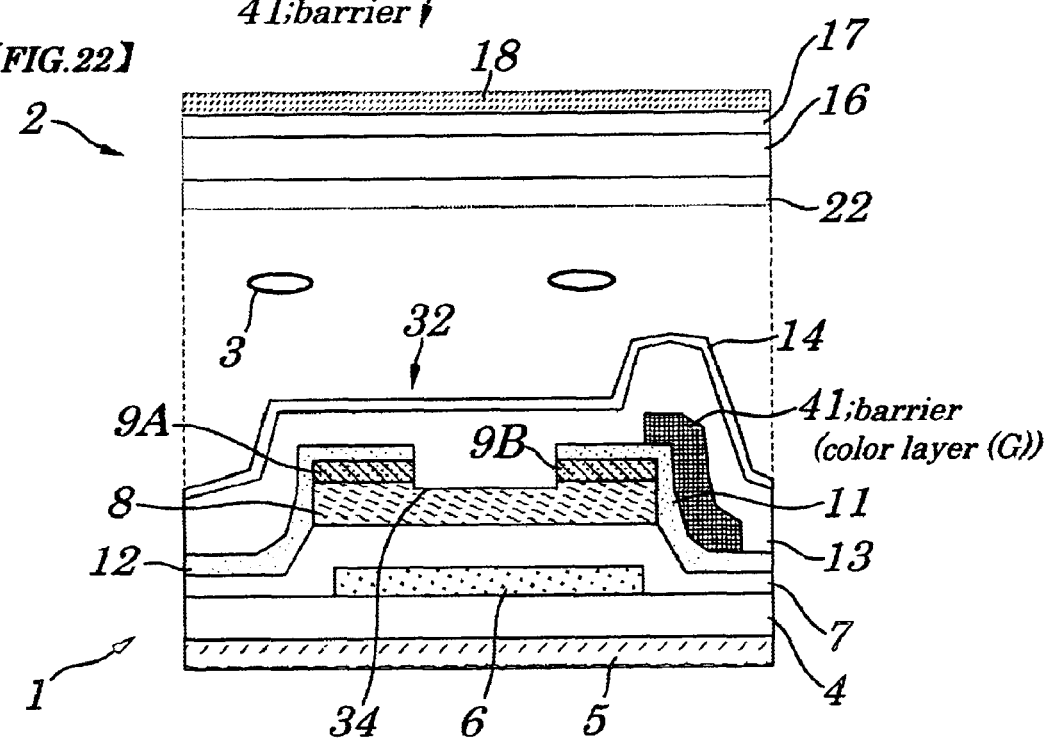

[FIG.23]
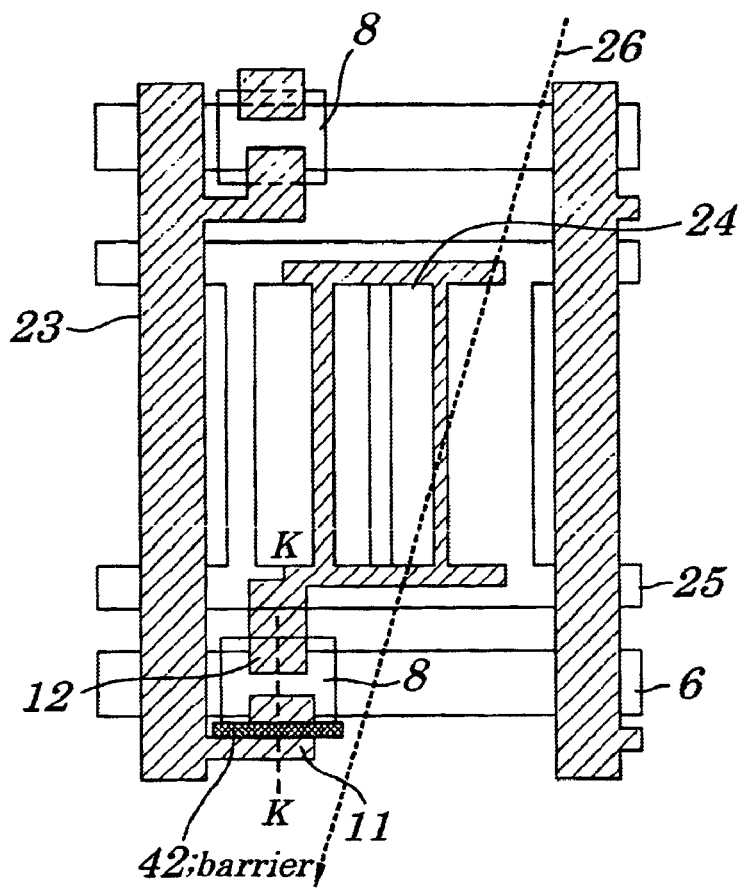
[FIG.24]
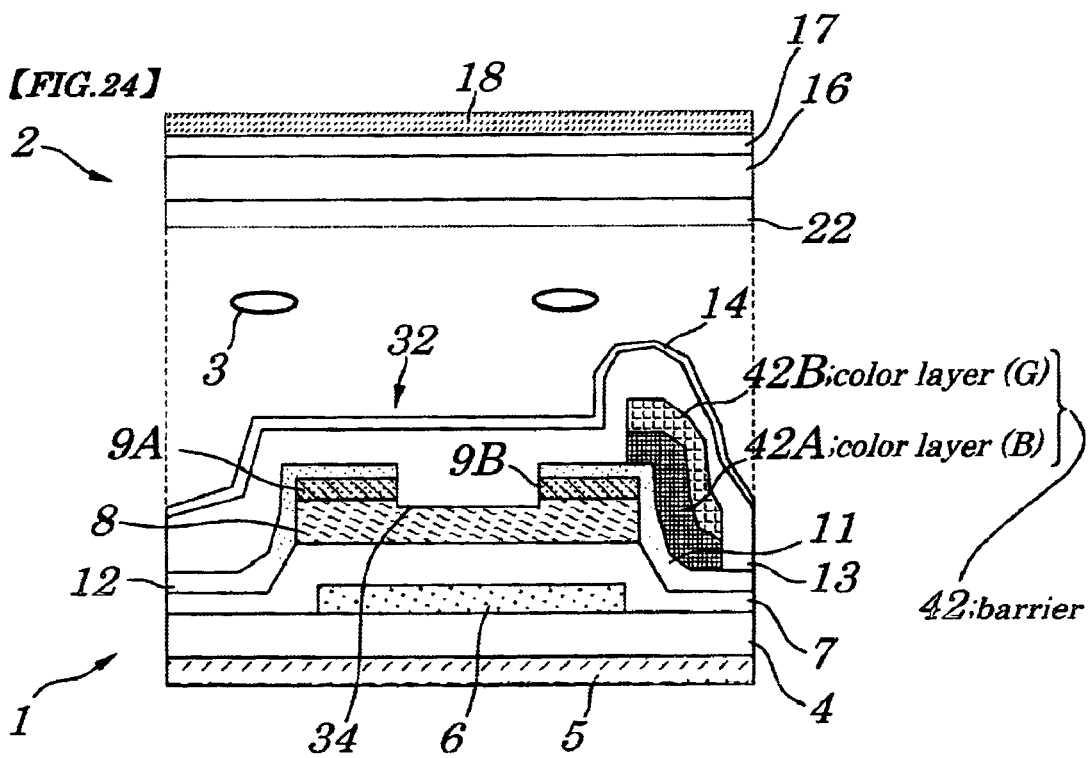

[FIG.25]
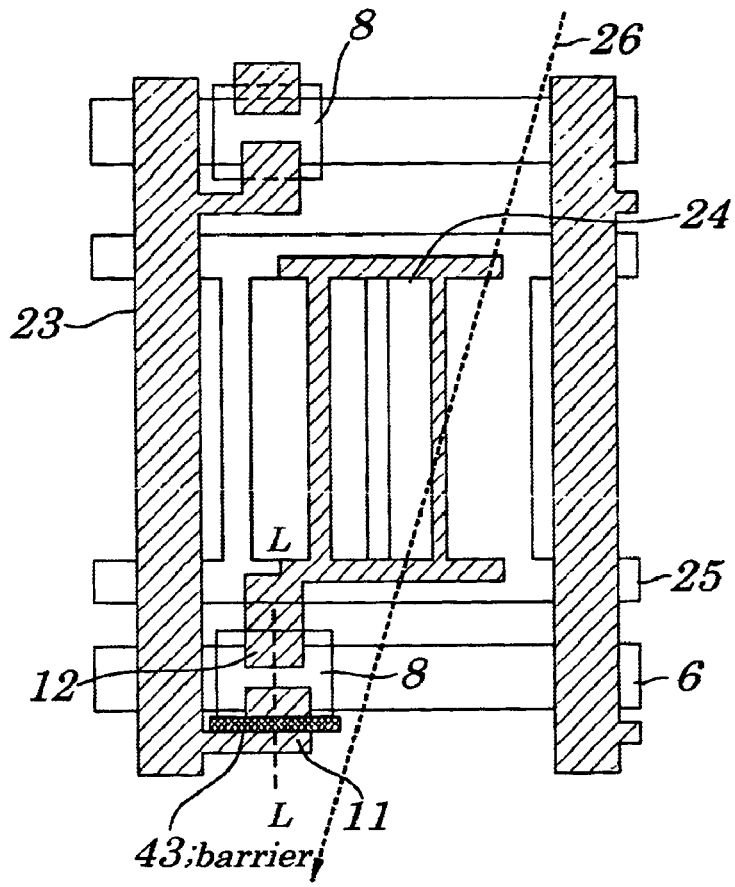
[FIG.26]
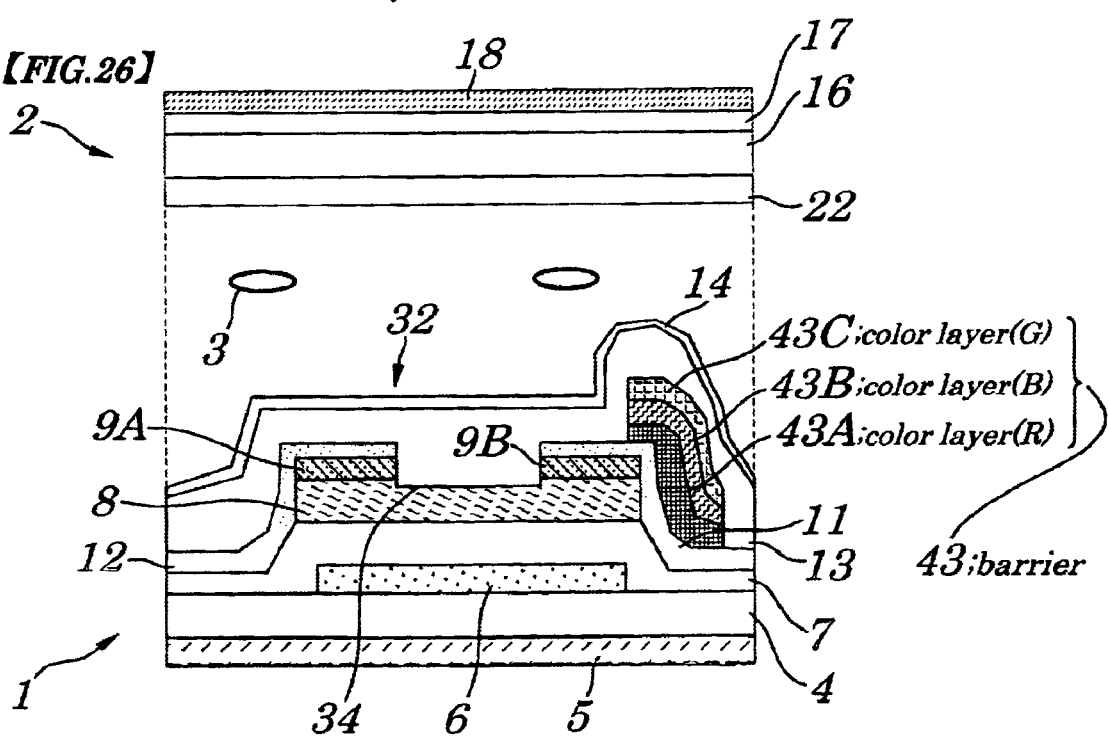

[FIG.27]
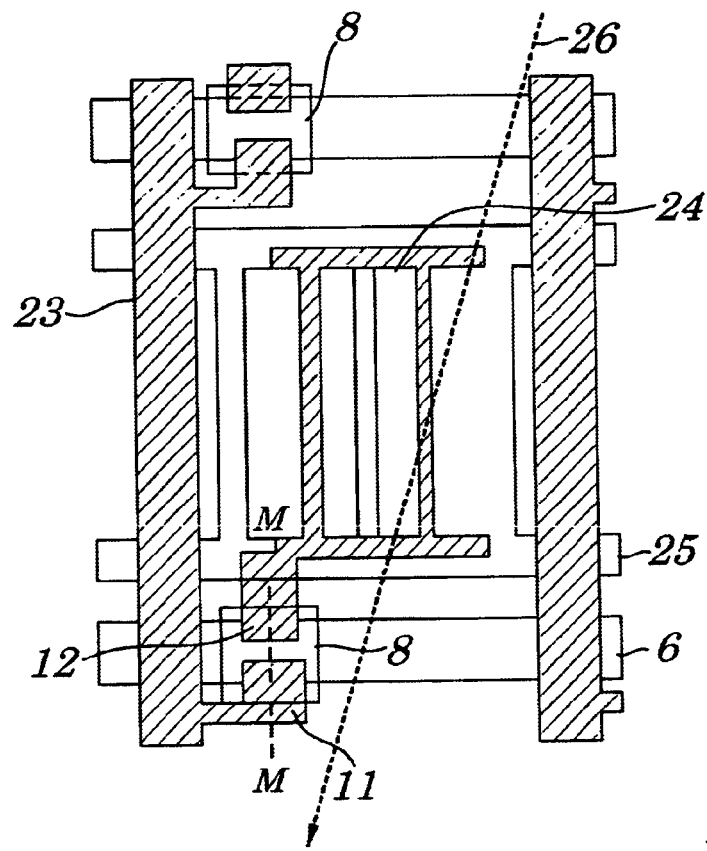
[FIG.28]
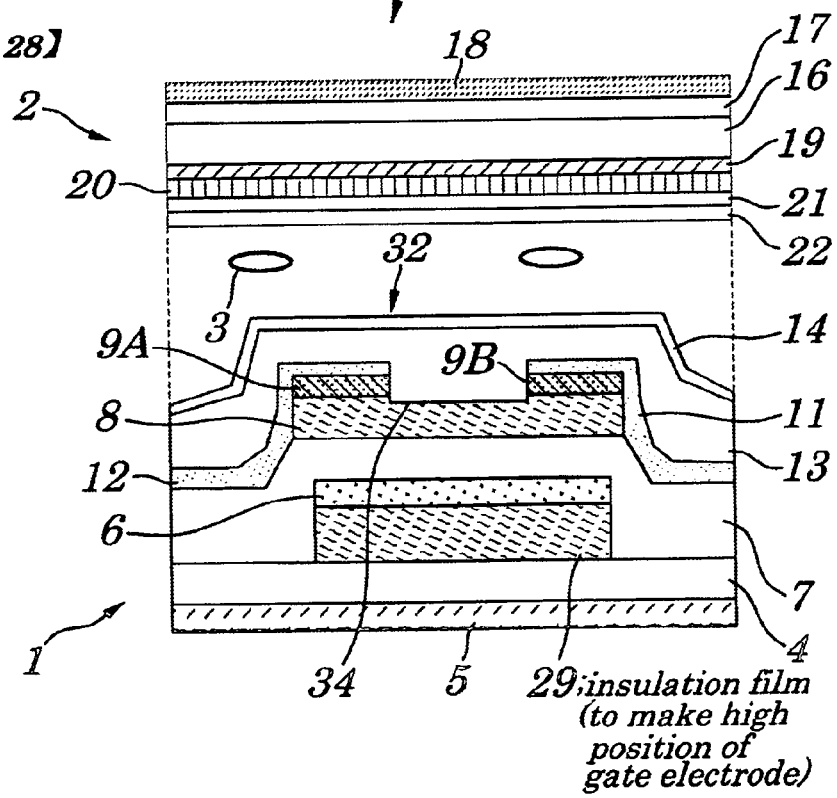
29; insulation film (to make high position of gate electrode)

[FIG.29]
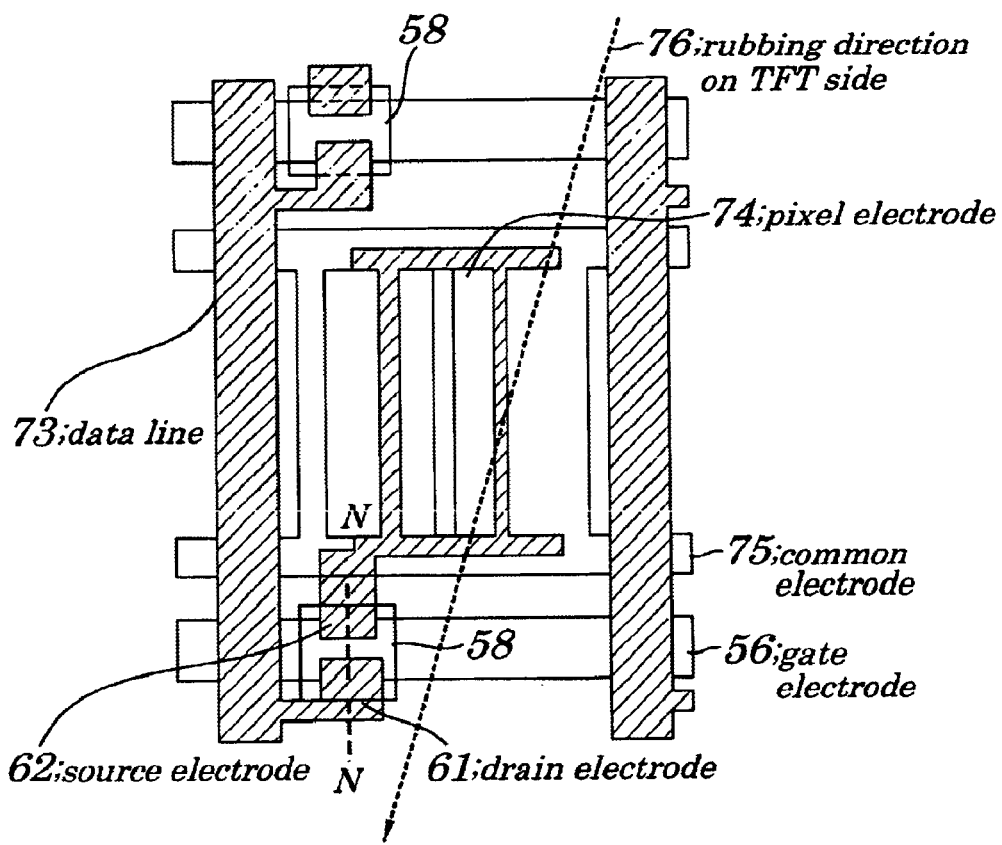
[FIG.30]
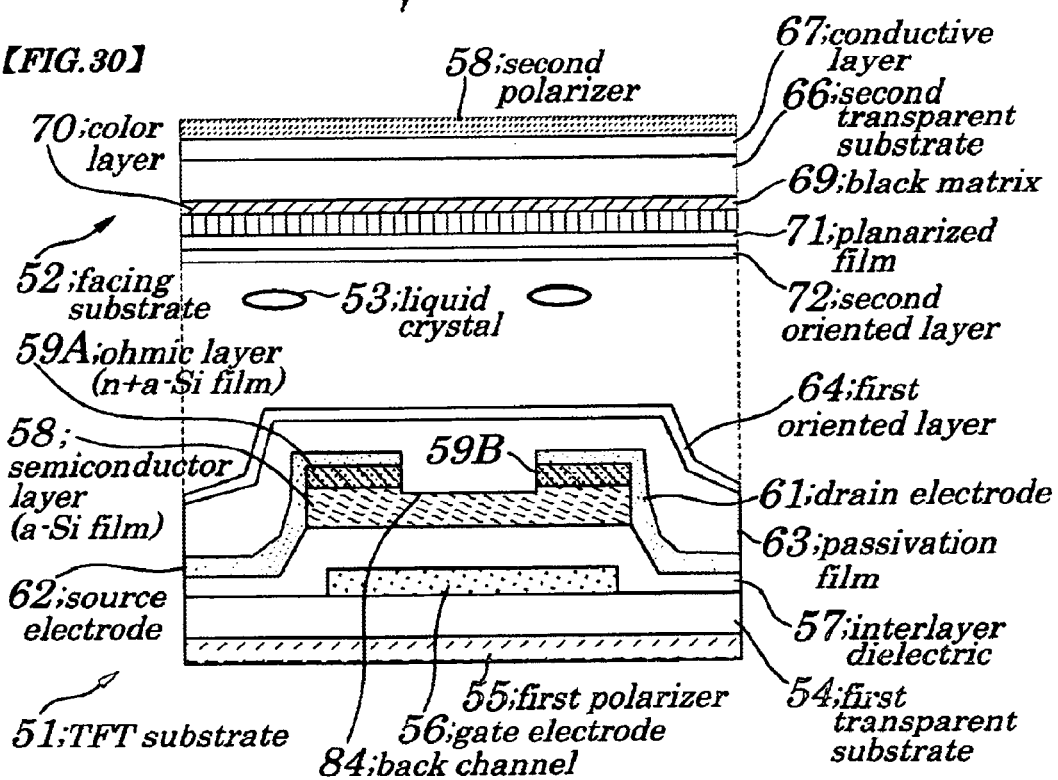

[FIG.31]
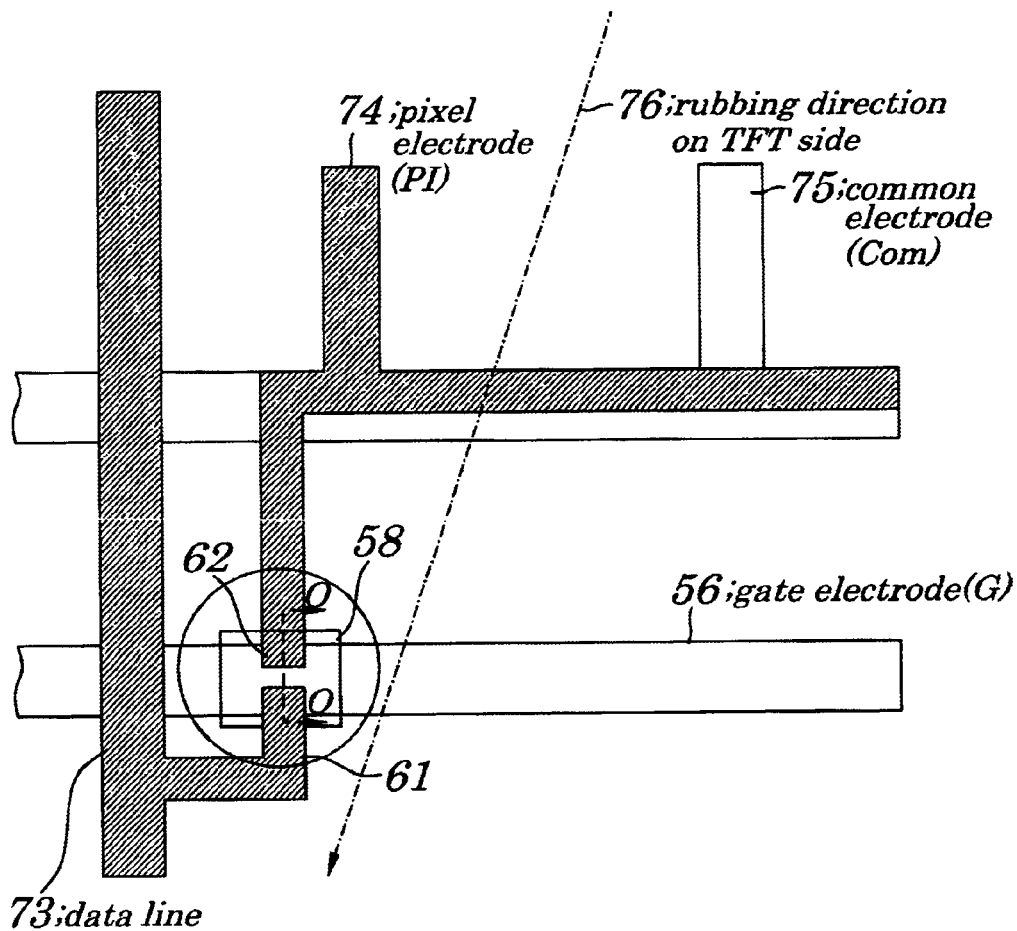
[FIG.32]
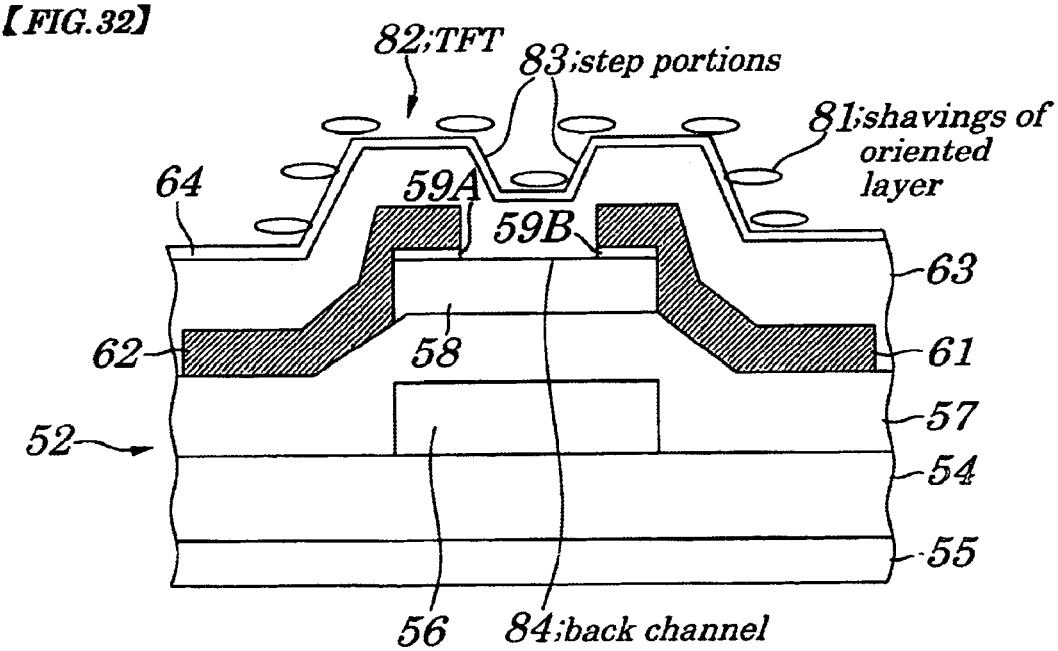

[FIG.33]
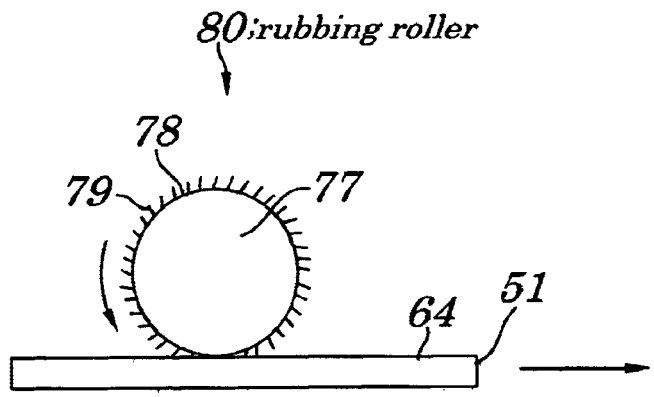
[FIG.34]
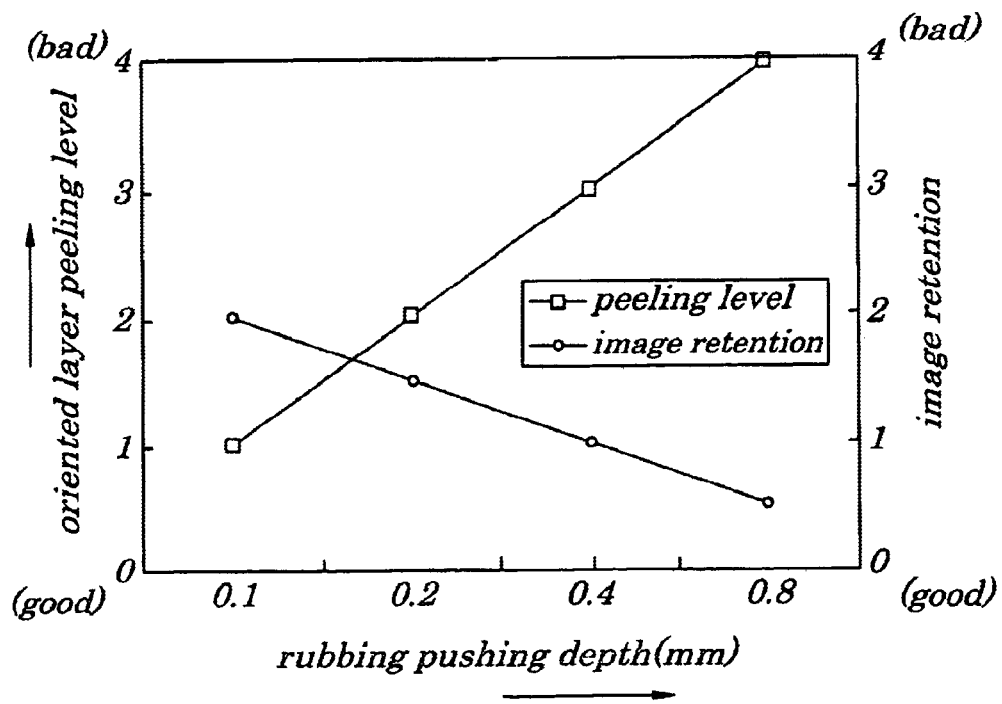

LIQUID CRYSTAL DISPLAY WITH SELECTIVELY PLACED BARRIERS

BACKGROUND OF THE INVENTION

1. Field of the Invention

The present invention relates to a liquid crystal display (hereinafter referred to as an "LCD") and a method for manufacturing the LCD and more particularly to the LCD in which an alignment layer is formed in a manner to cover a TFT (Thin Film Transistor) in a TFT substrate and to the method for manufacturing the LCD.

The present application claims priority of Japanese Patent Application No. 2000-275708 filed on Sep. 11, 2000, which is hereby incorporated by reference.

2. Description of the Related Art

An LCD is widely used as a display device for various information systems or a like. The LCD is so constructed that a liquid crystal is put or injected between a TFT substrate in which a TFT operating as a switching element is formed and a facing substrate. Such the LCD is roughly classified into a TN (Twisted Nematic)-LCD and an IPS (In-Plane Switching)-LCD according to a difference in a display method.

The TN-LCD is so configured that a pixel electrode is mounted on the TFT substrate and a common electrode on the facing substrate and that a driving voltage is applied to both the electrodes to cause a longitudinal electric field to be produced relative to the TFT substrate for operations. On the other hand, the IPS-LCD is so configured that both the pixel electrode and common electrode are mounted on one of the substrates, for example, on the side of the TFT substrate in a manner that both the pixel electrode and common electrode are placed in a direction opposite to each other in one plane and that a driving voltage is applied to both the electrodes to cause a traverse electric field to be produced relative to the TFT substrate for operations. Since the IPS-LCD exhibits an orientation of liquid crystal molecules along a surface of the TFT substrate, it has an advantage in that it can provide a wider viewing angle compared with the TN-LCD. Therefore, there is a tendency that the IPS-LCD is preferably used.

FIG. 28 is a top view of a conventional LCD. FIG. 29 is a cross-sectional view of the conventional LCD of FIG. 28 taken along the line N—N. FIG. 30 is a top view showing configurations of components existing in a vicinity of a gate electrode making up a main part of the conventional LCD of FIG. 29. FIG. 31 is a cross-sectional view of the conventional LCD of FIG. 30 taken along the line O—O. In FIG. 31, only a TFT substrate 51 is shown. As shown in FIG. 28 to FIG. 31, the conventional LCD is so configured that a liquid crystal 53 is sandwiched between the TFT substrate 51 and a facing substrate 52. The TFT substrate 51 includes a first transparent substrate 54 made of glass or a like, a first polarizer 55 formed on an underside of the first transparent substrate 54, a gate electrode 56 made of Al, Cr, Mo, or a like formed on a part of a surface of the first transparent substrate 54, an interlayer dielectric 57 made up of stacked films composed of $SiO_2$ (silicon dioxide) and SiN (silicon nitride) formed on the gate electrode 56 in a manner to cover the gate electrode 56, a semiconductor layer 58 consisting of a-Si (amorphous silicon) film or a like formed on the interlayer dielectric 57, ohmic layers 59A and 59B made of an $n^+$ type a-Si film or a like each being formed on each of end portions of the semiconductor layer 58, a drain electrode 61 made of Cr, Mo, or a like in a manner to be connected to the ohmic layer 59B, a source electrode 62 made of Cr, Mo, or a like in a manner to be connected to the ohmic layer 59A, a passivation film 63 made of the SiN or a like grown in a manner to cover the drain electrode 61, source electrode 62, and semiconductor layer 58; and a first alignment layer 64 made of polyimide or a like formed in a manner to cover the passivation film 63.

As shown in FIG. 28 and FIG. 30, in the TFT substrate 51, a data line 73 is formed in a direction orthogonal to the gate electrode 56 (that is, in a direction of a length of the TFT substrate 51) in a manner to be connected to the drain electrode 61 and a pixel electrode 74 is formed in a manner to be connected to the source electrode 62. The pixel electrode 74 and source electrode 62 are formed by using the same material and in a same process. Moreover, a common electrode 75 is formed in a manner to be placed opposite to the pixel electrode 74 in one plane. The common electrode 75 and gate electrode 56 are formed by using a same material and in a same process. Rubbing processing is performed in a rubbing direction 76 on the first alignment layer 64 on the TFT substrate 51. In order to determine a rotational direction of the liquid crystal 53 injected between the TFT substrate 51 and facing substrate 52, the rubbing direction 76 is set so as to be inclined by a fixed angle from the longitudinal direction.

The facing substrate 52 making up the conventional LCD includes a second transparent substrate 66 made of glass or a like, a second polarizer 58 formed on a back of the second transparent substrate 66 through a conductive layer 67, a black matrix 69 made of Ti, Cr, carbon resin, or a like formed on a surface of the second transparent substrate 66, a color layer 70 formed in a manner to cover the black matrix 69 and a second alignment layer 72 made of polyimide or a like formed on a planarized film 71 in a manner to cover the color layer 70.

The rubbing processing is performed by using a rubbing roller 80 as shown in FIG. 32. That is, a rubbing bristle 79 is attached through rubbing cloth 78 to the rubbing roller 80. By rotating the rubbing roller 80 and moving the TFT substrate 51 with the first alignment layer 64 mounted thereon under the rubbing roller 80 that is rotating, surfaces of the alignment layer 64 are rubbed by the rubbing fur 79 and, as a result, rubbing trenches are formed. However, at a time of the rubbing processing, shavings 81 of the alignment layer 64 are produced. If the shavings 81 are left on the pixel electrode 74, orientation of the liquid crystal 53 is perturbed, causing a display defect. To solve this problem, generally, in order to remove such the shavings 81 of the alignment layer 64, rubbing washing is performed by splashing pure water on the surface of the TFT substrate 51. However, though the shavings 81 of the alignment layer 64 can be removed from the pixel electrode 74 by such the rubbing washing, it is difficult to completely remove the shavings 81 being adhered to step portions of the TFT. That is, as shown in FIG. 31, the shavings 81 of the alignment layer 64 are still left at the step portions 83 of the TFT 82.

In the case of the IPS-LCD in particular, a material having low liquid crystal resistance is used to prevent display irregularity caused by accumulation of charges on the color layer 70, unwanted charge is induced in a back channel 84 of the TFT 82, which causes image retention when the liquid crystal 53 is used for a long time driving and displaying. To prevent the image retention as described above, it is necessary to eliminate an influence by the liquid crystal 53. To eliminate the influence by the liquid crystal 53, it is necessary to enhance insulation between the liquid crystal 53 and the back channel 84 of the TFT 82. More particularly, it is necessary to make large a thickness of the passivation film 63 to be grown on the back channel 84.

However, to make large the thickness of the passivation film 63, long deposition time has to be given in deposition process of the passivation film 63, which causes an increase in costs from a viewpoint of production and therefore which is impossible to be realized actually.

The inventor of the present invention has found that the shavings 81 of the alignment layer 64 being left on the step portions 83 on the back channel 84 of the TFT 82 can be effectively utilized as part of the insulating film serving to enhance the insulation between the liquid crystal 53 and back channel 84 of the TFT 82.

FIG. 33 is a result from an experiment carried out by the inventor of the present invention showing a relation among a rubbing pushing depth (abscissa), an alignment layer peeling level (abscissa on a left side) and image retention (abscissa on a right side). The rubbing pushing depth represents a cutting depth of the alignment layer 64 at the time of the rubbing processing using the rubbing roller 80. The alignment layer peeling level represents a degree of the occurrence of shavings 81 of the alignment layer 64. The experiment was carried out under conditions, for example, of a moving speed being 30 mm/s, the number of rotations being 1000 RPM (Revolutions Per Minute), a material for rotation roller being rayon or a like.

As is apparent from FIG. 33, there is a trade-off between the alignment layer peeling level and the image retention against the rubbing pushing depth. That is, the larger the rubbing pushing depth becomes, the worse the alignment layer peeling level and the better a degree of the image retention becomes. In contrast, the smaller the rubbing pushing depth becomes, the better the alignment layer peeling level and the worse the degree of the image retention. For example, if the rubbing pushing depth becomes about 0.8 mm, the alignment layer peeling level becomes a maximum 4 and, as a result, the shavings 81 of the alignment layer 64 are accumulated in the step portions 83 of the TFT 82 on the back channel 84, thus improving the degree of the image retention by about 0.5 points. This suggests, therefore, that, in order to improve the degree of the image retention, it is necessary to make larger the rubbing pushing depth.

However, the conventional LCD has a problem. That is, since the shavings 81 of the alignment layer 64 being effective for preventing the image retention are not accumulated much in the step portions 83 of the TFT 82 on the TFT substrate 51, the prevention of the image retention is difficult. That is, in the conventional LCD, as shown in FIG. 30 and FIG. 31, since the shavings 81 are removed by the washing processing following the rubbing processing on the alignment layer 64, the shavings 81 of the alignment layer 64 are not accumulated much in the step portions 83 of the TFT 82 on the back channel 84 in the TFT substrate 51. Therefore, the shavings 81 of the alignment layer 64 that are left hardly contribute to enhance the insulation between the liquid crystal 53 and the back channel 84 of the TFT 82.

SUMMARY OF THE INVENTION

In view of the above, it is an object of the present invention to provide an LCD in which shavings of an alignment layer are accumulated only in regions surrounding a TFT in a TFT substrate in a concentrated manner and a method for manufacturing the LCD.

According to a first aspect of the present invention, there is provided an LCD including:

a liquid crystal put between a TFT substrate and a facing substrate;

an alignment layer formed in a manner to cover the TFT in the TFT substrate; and a barrier formed in a portion surrounding the TFT on a downstream side in a rubbing direction of the alignment layer.

In the foregoing, a preferable mode is one wherein the barrier is formed so as to have an angle relative to the rubbing direction.

Also, a preferable mode is one wherein the barrier is made up of an insulating material.

Also, a preferable mode is one wherein the insulating material is a photosensitive resin.

Also, a preferable mode is one wherein the barrier is so formed that its aperture is disposed in a place facing opposite to an upstream side in the rubbing direction of the alignment layer and in a manner to form a shape of a framework surrounding all surfaces of a square semiconductor layer except the aperture.

Also, a preferable mode is one wherein the barrier is formed in a manner to form a shape of a character "⊐" made up of three sides of a square semiconductor layer except one side facing opposite to an upstream side in the rubbing direction of the alignment layer.

Also, a preferable mode is one wherein the barrier is formed in a manner to form a shape of a letter "L" being opened toward an upstream side of the rubbing direction of the alignment layer.

Also, a preferable mode is one wherein the barrier is made up of a color layer.

Also, a preferable mode is one wherein the barrier is made up of a plurality of kinds of stacked color layers.

Also, a preferable mode is one wherein the barrier is formed on a passivation film covering the TFT.

Furthermore, a preferable mode is one wherein the barrier is formed under the passivation film.

According to a second aspect of the present invention, there is provided an LCD including:

a liquid crystal put between a TFT substrate and a facing substrate;

an alignment layer formed in a manner to cover a TFT in the TFT substrate; and wherein the TFT is formed on a transparent insulating substrate and a position of only a gate electrode making up the TFT is made high, by using an insulation film grown on the transparent insulating substrate.

According to a third aspect of the present invention, there is provided a method of manufacturing an LCD in which a liquid crystal is put between a TFT substrate and a facing substrate and an alignment layer is formed in a manner to cover a TFT in the TFT substrate, including:

a process of covering a surface of the TFT with a passivation film after having formed the TFT on the TFT substrate;

a process of forming an insulating film on all surfaces of the passivation film; and a process of forming a barrier, by performing patterning on the insulating film, in a manner to cover portions surrounding the TFT including step portions of the TFT on a back channel and to be disposed at a place on a downstream side in a rubbing direction of the alignment layer.

In the foregoing, a preferable mode is one wherein a photosensitive resin is used as a material for the insulating film.

With the above configurations, the barrier made of the insulating material is formed in a manner to cover portions surrounding the TFT including step portions of the TFT on the back channel in the TFT substrate and to be disposed at the place on the downstream side in the rubbing direction and, therefore, when the rubbing processing is performed, shavings of the alignment layer can be accumulated only in regions surrounding the TFT on the back channel in the TFT substrate in a concentrated manner. Moreover, after the TFT is formed in the TFT substrate, the insulation film is grown on all the surfaces of the TFT, and then the barrier is formed by performing patterning on the insulation film at the desired place and therefore the easy formation of the barrier is made possible. Therefore, the shavings of the alignment layer can be accumulated, in a concentrated manner, only in portions surrounding the TFT in the TFT substrate.

BRIEF DESCRIPTION OF THE DRAWINGS

The above and other objects, advantages, and features of the present invention will be more apparent from the following description taken in conjunction with the accompanying drawings in which:

FIG. 1 is a top view showing configurations of an LCD according to a first embodiment of the present invention;

FIG. 2 is a cross-sectional view of the LCD of FIG. 1 taken along a line A—A;

FIG. 3 is a top view of configurations of components existing in a vicinity of a gate electrode making up main parts of the LCD according to the first embodiment of the present invention;

FIG. 4 is a cross-sectional view of the parts of FIG. 3 taken along a line B—B;

FIG. 5A to FIG. 5H are process diagrams showing methods of manufacturing the LCD in order of processes according to the first embodiment of the present invention;

FIG. 6 is a top view showing configurations of an LCD according to a second embodiment of the present invention;

FIG. 7 is a cross-sectional view the LCD of FIG. 6 taken along a line C—C;

FIG. 8 is a top view showing configurations of an LCD according to a third embodiment of the present invention;

FIG. 9 is a cross-sectional view the LCD of FIG. 8 taken along a line D—D;

FIG. 10 is a top view showing configurations of an LCD according to a fourth embodiment of the present invention;

FIG. 11 is a cross-sectional view the LCD of FIG. 10 taken along a line E—E;

FIG. 12 is a top view showing configurations of an LCD according to a fifth embodiment of the present invention;

FIG. 13 is a cross-sectional view the LCD of FIG. 12 taken along a line F—F;

FIG. 14 is a top view showing configurations of an LCD according to a sixth embodiment of the present invention;

FIG. 15 is a cross-sectional view the LCD of FIG. 14 taken along a line G—G;

FIG. 16 is a top view showing configurations of an LCD according to a seventh embodiment of the present invention;

FIG. 17 is a cross-sectional view the LCD of FIG. 16 taken along a line H—H;

FIG. 18 is a top view showing configurations of an LCD according to an eighth embodiment of the present invention;

FIG. 19 is a cross-sectional view the LCD of FIG. 18 taken along a line I—I;

FIG. 20 is a top view showing configurations of an LCD according to a ninth embodiment of the present invention;

FIG. 21 is a cross-sectional view the LCD of FIG. 20 taken along a line J—J;

FIG. 22 is a top view showing configurations of an LCD according to a tenth embodiment of the present invention;

FIG. 23 is a cross-sectional view the LCD of FIG. 22 taken along a line K—K;

FIG. 24 is a top view showing configurations of an LCD according to an eleventh embodiment of the present invention;

FIG. 25 is a cross-sectional view the LCD of FIG. 24 taken along a line L—L;

FIG. 26 is a top view showing configurations of an LCD according to a twelfth embodiment of the present invention;

FIG. 27 is a cross-sectional view the LCD of FIG. 26 taken along a line M—M;

FIG. 28 is a top view of a conventional LCD;

FIG. 29 is a cross-sectional view of the conventional LCD of FIG. 28 taken along a line N—N;

FIG. 30 is a top view showing configurations of components existing in a vicinity of a gate electrode making up a main part of the conventional LCD of FIG. 29;

FIG. 31 is a cross-sectional view of the conventional LCD of FIG. 30 taken along a line O—O;

FIG. 32 is a diagram showing a conventional rubbing roller used for rubbing processing; and FIG. 33 shows a relation among a rubbing pushing depth (abscissa), an alignment layer peeling level (abscissa on a left side) and image retention (abscissa on a right side);

DETAILED DESCRIPTION OF THE PREFERRED EMBODIMENTS

Best modes of carrying out the present invention will be described in further detail using various embodiments with reference to the accompanying drawings.

First Embodiment

FIG. 1 is a top view showing configurations of an LCD according to a first embodiment of the present invention. FIG. 2 is a top view of configurations of the LCD of FIG. 1 taken along a line A—A. FIG. 3 is a top view of configurations of parts existing in a vicinity of a gate electrode 6 making up main components of the LCD according to the first embodiment. FIG. 4 is a cross-sectional view of the parts of FIG. 3 taken along a line B—B. FIG. 5A to FIG. 5H are process diagrams showing methods of manufacturing the LCD in order of processes according to the first embodiment.

The LCD of the first embodiment, as shown in FIG. 1 to FIG. 4, is so constructed that a liquid crystal 3 is sandwiched between a TFT substrate 1 and a facing substrate 2.

The TFT substrate 1 includes a first transparent substrate 4 made of glass or a like, a first polarizer 5 formed on the underside of the first transparent substrate 4, a gate electrode 6 made of Al, Cr, Mo, or a like formed on a surface of a part of the first transparent substrate 4, an interlayer dielectric 7 made up of stacked layers composed of $SiO_2$ formed in a manner to cover the gate electrode 6, a semiconductor layer 8 made of an a-Si film or a like formed on the interlayer dielectric 7, an ohmic layer 9A made of an $n^+$ type a-Si film or a like formed on one end portion of the semiconductor layer 8, an ohmic layer 9B made of the $n^+$ type a-Si film or a like formed on the other end portion of the semiconductor layer 8, a drain electrode 11 made of Cr, Mo, or a like formed in a manner to be connected to the ohmic layer 9B, a source electrode 12 made of Cr, Mo, or a like formed in a manner to be connected to the ohmic layer 9A, a passivation film 13 made of SiN or a like formed on all surfaces of the drain electrode 11, source electrode 12, and a back channel 34, a first alignment film 14 made of polyimide or a like formed in a manner to cover the passivation film 13, and a barrier 10 consisting of a photo resist film (photosensitive resin) formed on the passivation film 13 in a manner to cover portions surrounding the TFT 32 including step portions 33 of the TFT 32 on the back channel 34 and in a manner to be disposed at a place on a downstream side in a rubbing direction 26.

Moreover, in the TFT substrate 1, as shown in FIG. 1 and FIG. 3, a data line 23 is formed in a direction orthogonal to the gate electrode 6 (that is, in a longitudinal direction of the TFT substrate 1) in a manner to be connected to the drain electrode 11, and a pixel electrode 24 is formed in a manner to be connected to the source electrode 12. The pixel electrode 24 and the source electrode 12 are formed using a same material and in a same process. A common electrode 25 is formed in a manner to be placed opposite to the pixel electrode 24 in one plane. The common electrode 25 and the gate electrode 6 are formed using a same material and in a same process. The rubbing direction 26 is so set as to be inclined by a fixed angle from a direction of a length of the TFT substrate 1 (that is, a direction in which the data line 23 is formed) in order to determine a rotational direction of the liquid crystal 3 when it is injected between the TFT substrate 1 and the facing substrate 2.

A barrier 10 contributes to accumulate shavings 31 of the first alignment layer 14, when rubbing processing is performed on the first alignment layer 14, only in portions surrounding the TFT 32 including step portions 33 of the TFT 32 on the back channel 34 in the TFT substrate 1. The barrier 10 is so disposed as to form a fixed angle relative to the rubbing direction 26 in order to have the shavings 31 of the first alignment layer 14 accumulated firmly only in portions surrounding the TFT 32. A height of the barrier 10 is set at not more than a cell gap being an interval between the TFT substrate 1 and the facing substrate 2. Moreover, a width W of the barrier 10 is determined based on fabrication accuracy by lithography and is preferably not more than 5 μm.

The facing electrode 2, as shown in FIG. 2, includes a second transparent substrate 16 made of glass or a like, a conductive layer 17 formed on a back of the second transparent substrate 16, a second polarizer 18 formed on a back of the conductive layer 17, a black matrix 19 made of Ti, Cr, carbon resin, or a like formed on a surface of the second transparent substrate 16, a color layer 20 formed in a manner to cover the black matrix 19, a planarized film 21 grown on the color layer 20, and a second alignment layer 22 consisting of polyimide or a like formed on the planarized film 21.

In the LCD of the first embodiment, since the barrier 10 made up of the photo resist film or a like is formed in a manner to cover portions surrounding the TFT 32 including step portions 33 of the TFT 32 on the back channel 34 in the TFT substrate 1 and to be disposed at a place on the downstream side in the rubbing direction 26, when the rubbing processing is performed, as shown in FIG. 4, the shavings 31 of the first alignment layer 14 are accumulated in portions surrounding the TFT 32 including step portions 33 of the TFT 32 on the back channel 34 in the TFT substrate 1. Therefore, as described above by referring to the results from the experiment, the level of the shavings 31 of the first alignment layer 14 can be made high by making large the rubbing pushing depth and the increased shavings 31 of the first alignment layer 14 contribute to enhance the insulation between the liquid crystal 3 and back channel 34 of the TFT 32, thus making it possible to prevent occurrence of image retention. Moreover, since the shavings 31 of the first alignment layer 14 have been removed from the pixel electrode 24 by the rubbing washing processing and therefore orientational ordering among liquid crystal molecules is not perturbed and no display defect occurs.

The method for manufacturing the LCD will be described, in order of processes, by referring to FIGS. 5A to 5H. First, as shown in FIG. 5A, after a conductive film made of Al, Cr, Mo, or a like has been formed on all the surfaces of the first transparent substrate 4 composed of glass or a like, the gate electrode 6 is formed by performing patterning operations on the conductive film using well-known photolithography or a like.

Next, as shown in FIG. 5B, by a CVD (Chemical Vapor Deposition) method, an $SiO_2$ film 7A and an SiN film 7B, which make up an interlayer dielectric 7, are sequentially formed on all the surfaces of the transparent insulating substrate 4 and the gate electrode 6 and then a semiconductor layer 8 made of a-Si and an $n^+$ type a-Si film 9 are sequentially grown on all the surfaces of the interlayer dielectric 7. Then, as shown in FIG. 5C, the patterning is performed on the semiconductor layer 8 and the $n^+$ type a-Si film 9 by photolithography so that they can have desired patterns.

Next, as shown in FIG. 5D, after a conductive film made of Cr has been grown, by sputtering, on all surfaces of the semiconductor layer 8, the $n^+$ type a-Si film 9 and the SiN film 7B, patterning operations are performed on the conductive film by photolithography so that the drain electrode 11 and the source electrode 12 are formed with only part of the n+type a-Si film 9 being exposed.

Then, as shown in FIG. 5E, part of the $n^+$ type a-Si film 9 is etched using, as masks, the drain electrode 11 and the source electrode 12, to expose a region to become the back channel 34 in the semiconductor layer 8.

Next, the passivation film 13 consisting of the $SiO_2$ film is grown, as shown in FIG. 5F, by the CVD method. Then, after a conductive film 27 has been formed on all the surfaces of the passivation film 13, patterning operations are performed on the conductive film 27 by lithography to form the pixel electrode 24 at a place (not shown).

Next, a photo resist film 28, as shown in FIG. 5G, is grown. Then, as shown in FIG. 5H, patterning operations are performed on the photo resist film 28 to form the barrier 10 in portions surrounding the TFT 32 including step portions 33 of the TFT 32 on the back channel 34. Then, after the liquid crystal 3 is injected between the facing substrate 2 manufactured in separate processes and the TFT substrate 1, the first and second polarizers 5 and 18 are mounted on the back of the facing substrate 2 and the TFT substrate 1, respectively, to finish the LCD as shown in FIG. 1 to FIG. 4.

Thus, according to the LCD of the first embodiment, since the barrier 10 made up of the photo resist film 28 or a like is formed in a manner to cover portions surrounding the TFT 32 including step portions 33 of the TFT 32 on the back channel 34 in the TFT substrate 1 and to be disposed at the place on the downstream side in the rubbing direction 26, when the rubbing processing is performed on the first alignment layer 14, the shavings 31 of the first alignment layer 14 are accumulated in portions surrounding the TFT 32 including step portions 33 of the TFT 32 on the back channel 34 in the TFT substrate 1.

Also, according to the LCD of the first embodiment, since, after the TFT 32 has been formed in the TFT substrate 1, the photo resist film 28 is grown on all the surfaces of the TFT 32 and patterning operations are performed on the photo resist film 28 to have the barrier 10 formed at the desired place, the formation of the barrier 10 can be achieved easily. Therefore, the shavings 31 of the first alignment layer 14 can be accumulated only in portions surrounding the TFT 32 in the TFT substrate 1.

Second Embodiment

FIG. 6 is a top view showing configurations of an LCD according to a second embodiment of the present invention. FIG. 7 is a cross-sectional view of the LCD of FIG. 6 taken along a line C—C. Configurations of the LCD of the second embodiment differ greatly from those of the LCD of the first embodiment in that a shape of a barrier 30 is different.

As shown in FIG. 6, an aperture 30A is formed at a place opposite to an upstream side of a rubbing direction 26. The barrier 30 is made up of a framework body 30B formed in a shape of a framework surrounding all portions of a square semiconductor layer 8 except the aperture 30A.

In the embodiment, therefore, since the barrier 30 having such the shape as described above is formed, when rubbing processing is performed on a first alignment layer 14, the barrier 30 serves as a guide and therefore shavings 31 of the first alignment layer 14 are gathered in the framework body 30B in a concentrated manner. As a result, the shavings 31 can be accumulated in portions surrounding a TFT 32 including step portions 33 of the TFT 32 on a back channel 34 in a TFT substrate 1. Configurations of the LCD of the second embodiment are the same as those in the first embodiment except the above. Therefore, in FIG. 6 and FIG. 7, same reference numbers are assigned to parts corresponding to those in FIG. 1 to FIG. 4 and their descriptions will be omitted.

Thus, approximately the same effects obtained in the first embodiment can be achieved in the second embodiment.

Third Embodiment

FIG. 8 is a top view showing configurations of an LCD according to a third embodiment of the present invention. FIG. 9 is a cross-sectional view the LCD of FIG. 8 taken along a line D—D. Configurations of the LCD of the third embodiment differ greatly from those of the LCD of the first embodiment in that a shape of a barrier 35 is different.

As shown in FIG. 8, in the LCD of the third embodiment, a barrier 35 formed in a TFT substrate 1 is made up of a framework body 35A in a shape of a character "⊐" formed by three sides of a square semiconductor layer 8 except one side facing opposite to an upstream portion in a rubbing direction 26.

In the embodiment, therefore, since the barrier 35 having such the shape as described above is formed, when rubbing processing is performed on a first alignment layer 14, the one side making up an opening of the framework body 35A serves as a guide and therefore shavings 31 of the first alignment layer 14 are gathered in the framework body 35 in a concentrated manner. As a result, the shavings 31 can be accumulated in portions surrounding a TFT 32 including step portions 33 of the TFT 32 on a back channel 34 in the TFT substrate 1.

Thus, approximately the same effects obtained in the first embodiment can be achieved in the third embodiment.

Fourth Embodiment

FIG. 10 is a top view showing configurations of an LCD according to a fourth embodiment of the present invention. FIG. 11 is a cross-sectional view the LCD of FIG. 10 taken along a line E—E. Configurations of the LCD of the fourth embodiment differ greatly from those of the LCD of the first embodiment in that a shape of a barrier 36 is different.

As shown in FIG. 10, in the LCD of the fourth embodiment, the barrier 36 formed in a TFT substrate 1 is made up of a framework body 36A in a shape of a letter "L" formed by two sides of a square semiconductor layer 8 backing against a data line 23, except two sides facing opposite to an upstream side in a rubbing direction 26.

In the embodiment, therefore, since the barrier 36 having such the shape as described above is formed, when rubbing processing is performed on a first alignment layer 14, shavings 31 of the first alignment layer 14 are gathered in the framework body 36A in a concentrated manner. As a result, the shavings 31 are accumulated in portions surrounding a TFT 32 including step portions 33 of the TFT 32 on a back channel 34 in the TFT substrate 1.

Thus, approximately the same effects obtained in the first embodiment can be achieved in the fourth embodiment.

Fifth Embodiment

FIG. 12 is a top view showing configurations of an LCD according to a fifth embodiment of the present invention. FIG. 13 is a cross-sectional view the LCD of FIG. 12 taken along a line F—F. Configurations of the LCD of the fifth embodiment differ greatly from those of the LCD of the first embodiment in that a shape of a barrier 37 is different. As shown in FIG. 12, in the LCD of the fifth embodiment, the barrier 37 formed in a TFT substrate 1 is made up of a framework body 37A in a shape of a letter of a reversed "L" formed by two sides of a square semiconductor layer 8 facing opposite to a data line 23, except two sides facing opposite to an upstream side in a rubbing direction 26.

In the embodiment, therefore, since the barrier 37 having such the shape as described above is formed, when rubbing processing is performed on a first alignment layer 14, shavings 31 of the first alignment layer 14 are gathered in the framework body 37A in the shape of the letter of the reversed "L" in a concentrated manner. As a result, the shavings 31 are accumulated in portions surrounding a TFT 32 including step portions 33 of the TFT 32 on a back channel 34 in the TFT substrate 1.

Thus, approximately the same effects obtained in the first embodiment can be achieved in the fifth embodiment.

Sixth Embodiment

FIG. 14 is a top view showing configurations of an LCD according to a sixth embodiment of the present invention. FIG. 15 is a cross-sectional view the LCD of FIG. 14 taken along a line G—G. Configurations of the LCD of the sixth embodiment differ greatly from those of the LCD of the first embodiment in that a shape of a barrier 38 is different. As shown in FIG. 15, in the LCD of the sixth embodiment, the barrier 38 formed in a TFT substrate 1 is made up of a color layer in green color out of three primary colors R (red), G (green), and B (blue) in a manner to cover portions surrounding a TFT 32 including step portions 33 of the TFT 32 on a back channel 34 and to be disposed at a place on a downstream side in a rubbing direction 26.

In the first to fifth embodiments, a color layer 20 is formed on the side of a facing substrate 2, however, in the sixth embodiment, the color layer 20 is formed on the TFT substrate 1 side so that the barrier 38 is also formed at the same time when the color layer 20 is grown. Therefore, only by changing a shape of a mask used when patterning is performed on the color layer, the barrier 38 can be formed without an additional and special process.

In the embodiment, therefore, since the barrier 38 having such the shape as described above is formed, when rubbing processing is performed on a first alignment layer 14, shavings 31 of the first alignment layer 14 are gathered in the barrier 38 in a concentrated manner. As a result, the shavings 31 can be accumulated in portions surrounding the TFT 32 including the step portions 33 of the TFT 32 on the back channel 34 in the TFT substrate 1.

Thus, approximately the same effects obtained in the first embodiment can be achieved in the sixth embodiment.

Seventh Embodiment

FIG. 16 is a top view showing configurations of an LCD according to a seventh embodiment of the present invention. FIG. 17 is a cross-sectional view the LCD of FIG. 16 taken along a line H—H. Configurations of the LCD of the seventh embodiment differ greatly from those of the LCD of the sixth embodiment in that a barrier 39 is made up of two kinds of color layers. As shown in FIG. 17, in the LCD of the seventh embodiment, the barrier 39 formed in a TFT substrate 1 is made up of the two kinds of color layers, one being a color layer 39A in blue (B) color and the other being a color layer 39B in green (G) color, out of three primary colors R (red), G (green), and B (blue) in a manner to cover portions surrounding a TFT 32 including step portions 33 of the TFT 32 on a back channel 34 and formed at a place on a downstream side in a rubbing direction 26.

In the embodiment, the color layer 39A in blue color is first formed by means of the patterning and then the color layer 39B is formed in a manner to cover the color layer 39A and finally the barrier 39 is formed by means of the patterning. Therefore, a sufficient thickness of the barrier 39 can be easily ensured.

In the embodiment, therefore, since the barrier 39 having such the shape as described above is formed, when rubbing processing is performed on a first alignment layer 14, shavings 31 of the first alignment layer 14 are gathered in the barrier 39 in a concentrated manner. As a result, the shavings 31 can be accumulated in portions surrounding the TFT 32 including the step portions 33 of the TFT 32 on the back channel 34 in the TFT substrate 1.

Thus, approximately the same effects obtained in the second embodiment can be achieved in the seventh embodiment. Additionally, a sufficient thickness of the barrier 39 can be ensured easily.

Eighth Embodiment

FIG. 18 is a top view showing configurations of an LCD according to an eighth embodiment of the present invention. FIG. 19 is a cross-sectional view the LCD of FIG. 18 taken along a line I—I. Configurations of the LCD of the eighth embodiment differ greatly from those of the LCD of the seventh embodiment in that a barrier 40 is made up of three kinds of color layers. As shown in FIG. 19, in the LCD of the eighth embodiment, the barrier 40 formed in a TFT substrate 1 is made up of the three kinds of color layers, one being a color layer 40A in red (R) color and another being a color layer 40B in blue (B) color, and another being a color layer 40C in green (G) using the primary three colors in a manner to cover portions surrounding a TFT 32 including step portions 33 of the TFT 32 on a back channel 34 and formed at a place on a downstream side in a rubbing direction 26.

In the embodiment, the color layer 40A in red color is first formed by means of patterning, then the color layer 40B is formed in a manner to cover the color layer 40A, the color layer 40C is formed by means of the patterning in a manner to cover the color layer 40B, and finally the barrier 40 is formed by means of the patterning. Therefore, a sufficient thickness of the barrier 40 can be easily ensured as in the case of the seventh embodiment.

In the embodiment, therefore, since the barrier 40 having such the shape is formed, when the rubbing processing is performed on a first alignment layer 14, shavings 31 of the first alignment layer 14 are gathered in the barrier 40 in a concentrated manner. As a result, the shavings 31 can be accumulated in portions surrounding the TFT 32 including the step portions 33 of the TFT 32 on the back channel 34 in the TFT substrate 1.

Thus, approximately the same effects obtained in the seventh embodiment can be achieved in the eighth embodiment. Additionally, a sufficient thickness of the barrier 40 can be ensured easily.

Ninth Embodiment

FIG. 20 is a top view showing configurations of an LCD according to a ninth embodiment of the present invention. FIG. 21 is a cross-sectional view the LCD of FIG. 20 taken along a line J—J. Configurations of the LCD of the ninth embodiment differ greatly from those of the LCD of the sixth embodiment in that a barrier 41 of a color layer is formed under a passivation film 13. As shown in FIG. 21, in the LCD of the ninth embodiment, the barrier 41 formed in a TFT substrate 1 is made up of a color layer in green color out of three primary colors R (red), G (green), and B (blue) in a manner to cover, under the passivation film 13, portions surrounding a TFT 32 including step portions 33 of the TFT 32 on a back channel 34 and formed at a place on a downstream side in a rubbing direction 26.

In this embodiment, prior to deposition of the passivation film 13, the barrier 41 is grown in approximately the same way as in the sixth embodiment. Then, the passivation film 13 made of an organic material is formed followed by formation of a first alignment layer 14. Since the barrier 41 is protected by the passivation film 13 and is not exposed directly outside, stability is given to the barrier 41.

In the embodiment, therefore, since the barrier 41 having such the shape as described above is formed, when rubbing processing is performed on the first alignment layer 14, shavings 31 of the first alignment layer 14 are gathered indirectly in the barrier 41 in a concentrated manner. As a result, the shavings 31 can be accumulated in portions surrounding the TFT 32 including the step portions 33 of the TFT 32 on the back channel 34 in the TFT substrate 1.

Thus, approximately the same effects obtained in the sixth embodiment can be achieved in the ninth embodiment. Additionally, the barrier 41 can have stability in its operations.

Tenth Embodiment

FIG. 22 is a top view showing configurations of an LCD according to a tenth embodiment of the present invention.

FIG. 23 is a cross-sectional view the LCD of FIG. 22 taken along a line K—K. Configurations of the LCD of the tenth embodiment differ greatly from those of the LCD of the ninth embodiment in that a barrier 42 is made up of two kinds of color layers. As shown in FIG. 23, in the LCD of the tenth embodiment, the barrier 42 formed under a passivation film 13 is made up of two kinds of stacked color layers consisting of a color layer 42A in blue color and a color layer 42B in green color using two colors out of three primary colors R (red), G (green), and B (blue) in a manner to cover portions surrounding a TFT 32 including step portions 33 of the TFT 32 on a back channel 34 and formed at a place on a downstream side in a rubbing direction 26.

In this embodiment, prior to deposition of the passivation film 13, the barrier 42 is grown in approximately the same way as in the seventh embodiment. Then, the passivation film 13 made of an organic material is formed followed by formation of a first alignment layer 14.

In the embodiment, therefore, since the barrier 42 having such the shape as described above is formed, when rubbing processing is performed on the first alignment layer 14, shavings 31 of the first alignment layer 14 are gathered indirectly in the barrier 42 in a concentrated manner. As a result, the shavings 31 can be accumulated in portions surrounding the TFT 32 including the step portions 33 of the TFT 32 on the back channel 34 in the TFT substrate 1.

Thus, approximately the same effects obtained in the ninth embodiment can be achieved in the tenth embodiment.

Eleventh Embodiment

FIG. 24 is a top view showing configurations of an LCD according to an eleventh embodiment of the present invention. FIG. 25 is a cross-sectional view the LCD of FIG. 24 taken along a line L—L. Configurations of the LCD of the eleventh embodiment differ greatly from those of the LCD of the tenth embodiment in that a barrier 43 is made up of three kinds of color layers.

As shown in FIG. 25, in the LCD of the eleventh embodiment, the barrier 43 formed under a passivation film 13 is made up of the three kinds of stacked color layers, one being a color layer 43A in red (R) color and another being a color layer 43B in blue (B) color, and another being a color layer 43C in green (G) in a manner to cover portions surrounding a TFT 32 including step portions 33 of the TFT 32 on a back channel 34 and to be disposed at a place on a downstream side in a rubbing direction 26.

In this embodiment, prior to deposition of the passivation film 13, the barrier 43 is grown in approximately the same way as in the eighth embodiment. Then, the passivation film 13 made of an organic material is formed followed by formation of a first alignment layer 14.

In the embodiment, therefore, since the barrier 43 having such the shape as described above is formed, when rubbing processing is performed on the first alignment layer 14, shavings 31 of the first alignment layer 14 are gathered indirectly in the barrier 43 in a concentrated manner. As a result, the shavings 31 can be accumulated in portions surrounding the TFT 32 including the step portions 33 of the TFT 32 on the back channel 34 in the TFT substrate 1.

Thus, approximately the same effects obtained in the tenth embodiment can be achieved in the eleventh embodiment.

Twelfth Embodiment

FIG. 26 is a top view showing configurations of an LCD according to a twelfth embodiment of the present invention.

FIG. 27 is a cross-sectional view the LCD of FIG. 26 taken along a line M—M. Configurations of the LCD of the twelfth embodiment differ greatly from those of the LCD of the first embodiment in that a thickness of an insulation film 29 formed on a back channel 34 is made larger by making high a position of a gate electrode 6.

As shown in FIG. 27, in the LCD of the twelfth embodiment, the insulation film 29 made of a photosensitive resin is grown under the gate electrode 6, which serves to make high a position of the gate electrode 6 compared with other gate electrodes employed in the LCDs of the first to eleventh embodiments. Since a degree of unevenness on a surface of a TFT substrate 1 is increased when a passivation film 13 is formed in a subsequent process, by making high the position of the gate electrode 6, the thickness of the passivation film 13 can be thus made uniform compared with portions surrounding the passivation film 13. As a result, it is possible to enhance insulation between a liquid crystal 3 and a back channel 34 of a TFT 32 in the TFT substrate 1.

As described above, in the embodiment, since, by making high the position of the gate electrode 6, the passivation film 13 having the uniform thickness can be formed in portions surrounding the TFT 32 including step portions 33 of the TFT 32 on the back channel 34 in the TFT substrate 1, the insulation between the liquid crystal 3 and the back channel 34 of the TFT 32 in the TFT substrate 1 can be enhanced.

Thus, approximately the same effects obtained in the first embodiment can be achieved in the twelfth embodiment.

It is apparent that the present invention is not limited to the above embodiments but may be changed and modified without departing from the scope and spirit of the invention. For example, as the insulating material for the barrier, any one can be selected arbitrarily out of known photosensitive resins including polyimide, polyamideimide, polyamide, polystyrene, polyurethane or a like. Moreover, as the material for the insulation film used to make high the position of the gate electrode, any one of the above materials can be selected as well. Furthermore, in the above embodiments, the present invention is applied to the IPS-LCD, however, it may be applied to the TN-LCD.

Also, in the above embodiments, as the material for the semiconductor layer of the TFT formed in the TFT substrate, amorphous silicon is used, however, other semiconductor materials such as poly-Si may be employed. The method for deposition of each of the conductive layers, insulation films shown in the above embodiment is merely an example and other methods may be used depending on the purpose, applications; or a like.

What is claimed is:

1. A liquid crystal display comprising:
   a liquid crystal put between a thin film transistor substrate and a facing substrate;
   an alignment layer formed in a manner to cover said thin film transistor substrate in said TFT substrate; and
   a barrier formed in a portion surrounding said thin film transistor substrate on a downstream side in a rubbing direction of said alignment layer.

2. The liquid crystal display according to claim 1, wherein said barrier is formed so as to have an angle relative to said rubbing direction.

3. The liquid crystal display according to claim 1, wherein said barrier is made up of an insulating material.

4. The liquid crystal display according to claim 3, wherein said insulating material is a photosensitive resin.

5. The liquid crystal display according to claim 1, wherein said barrier is so formed that its aperture is disposed in a place facing opposite to an upstream side in said rubbing direction of said alignment layer and in a manner to form a shape of a framework surrounding all surfaces of a square semiconductor layer except said aperture.

6. The liquid crystal display according to claim 1, wherein said barrier is formed in a manner to form a shape of a character "⊐" made up of three sides of a square semiconductor layer except one side facing opposite to an upstream side in said rubbing direction of said alignment layer.

7. The liquid crystal display according to claim 1, wherein said barrier is formed in a manner to form a shape of a letter "L" being opened toward an upstream side of said rubbing direction of said alignment layer.

8. The liquid crystal display according to claim 1, wherein said barrier is made up of a color layer.

9. The liquid crystal display according to claim 1, wherein said barrier is made up of a plurality of kinds of stacked color layers.

10. The liquid crystal display according to claim 1, wherein said barrier is formed on a passivation film covering said TFT.

11. The liquid crystal display according to claim 10, wherein said barrier is formed under said passivation film.

12. A liquid crystal display comprising:
a liquid crystal put between a thin film transistor substrate and a facing substrate;
an alignment layer formed in a manner to cover a thin film transistor in said thin film transistor substrate; and
wherein said thin film transistor is formed on a transparent insulating substrate and a position of only a gate electrode making up said thin film transistor is made high, by using an insulation film grown on said transparent insulating substrate, the insulation film having a width equal to a width of the gate electrode.

13. A liquid crystal display comprising:
a liquid crystal put between a thin film transistor substrate and a facing substrate;
an alignment layer formed in a manner to cover said thin film transistor substrate in said TFT substrate; and
a barrier formed in a portion surrounding said thin film transistor substrate on a downstream side in a rubbing direction of said alignment layer,
wherein said insulating material is a photosensitive resin.

* * * * *